US011450042B2

(12) United States Patent
Chen et al.

(10) Patent No.: US 11,450,042 B2
(45) Date of Patent: Sep. 20, 2022

(54) DATA PROCESSING FOR GENERATING A RANDOM WALK SEQUENCE

(71) Applicant: TENCENT TECHNOLOGY (SHENZHEN) COMPANY LIMITED, Guangdong (CN)

(72) Inventors: Shimin Chen, Shenzhen (CN); Dongyan Zhou, Shenzhen (CN); Songjie Niu, Shenzhen (CN); Donghai Yu, Shenzhen (CN); Shijie Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/372,099

(22) Filed: Jul. 9, 2021

(65) Prior Publication Data

US 2021/0335025 A1 Oct. 28, 2021

Related U.S. Application Data

(63) Continuation of application No. PCT/CN2020/079459, filed on Mar. 16, 2020.

(30) Foreign Application Priority Data

Apr. 8, 2019 (CN) .......................... 201910276296.2

(51) Int. Cl.
*G06T 11/20* (2006.01)
*G06F 16/901* (2019.01)
*G06Q 50/00* (2012.01)

(52) U.S. Cl.
CPC ........ *G06T 11/206* (2013.01); *G06F 16/9024* (2019.01); *G06Q 50/01* (2013.01)

(58) Field of Classification Search
None
See application file for complete search history.

(56) References Cited

U.S. PATENT DOCUMENTS 11,281,964 B2 * 3/2022 Aimone ................... G06N 3/08
2012/0197834 A1 8/2012 Panigraphy et al.
(Continued)

FOREIGN PATENT DOCUMENTS

| CN | 106777284 A | 5/2017 |
| CN | 107943934 A | 4/2018 |

(Continued)

OTHER PUBLICATIONS

Naoki Masuda, Mason A. Porter, Renaud Lambiotte, "Random Walks and Diffusion on Networks", 2017, Physics Reports 716-717:1-58 (Year: 2017).*

(Continued)

*Primary Examiner* — Michael J Cobb
(74) *Attorney, Agent, or Firm* — ArentFox Schiff LLP

(57) ABSTRACT

A data processing method is provided. In the method, a historical walk vertex adjacent to a target walk vertex is determined. An edge transition probability between the target walk vertex and each of a set of next possible vertexes in a first out-neighbor set is determined according to first out-edge information. A to-be-reached vertex of the set of next possible vertexes in the first out-neighbor set is determined according to the edge transition probabilities. Second out-edge information corresponding to the target walk vertex is generated based on the first out-neighbor set. Walking from the target walk vertex to the to-be-reached vertex is performed. The second out-edge information is transmitted to the to-be-reached vertex. Further, a random walk sequence corresponding to the target walk vertex is gener- (Continued)

ated based on a walk quantity corresponding to the target walk vertex reaching a preset threshold for walk steps.

20 Claims, 14 Drawing Sheets

(56) References Cited

U.S. PATENT DOCUMENTS

| | | | |
|---|---|---|---|
| 2017/0083824 A1* | 3/2017 | Miyakoshi | G06F 8/35 |
| 2017/0249340 A1* | 8/2017 | Okuda | G06K 9/6218 |
| 2018/0121823 A1 | 5/2018 | Bauer et al. | |
| 2021/0049171 A1* | 2/2021 | Ziauddin | G06F 16/9024 |
| 2021/0335025 A1* | 10/2021 | Chen | G06Q 50/01 |

FOREIGN PATENT DOCUMENTS

| | | |
|---|---|---|
| CN | 108108407 A | 6/2018 |
| CN | 110019989 A | 7/2019 |

OTHER PUBLICATIONS

International Search Report Issued in Application PCT/CN2020/079459 dated Jun. 15, 2020, with English translation, (6 pages).
Written Opinion Issued in Application PCT/CN2020/079459 dated Jun. 15, 2020 (4 pages).
Supplementary European Search Report dated Apr. 21, 2022 in Application No. 20786716.9, 9 pages.
Dongyan Zhou et al: "Efficient Graph Computation for Node2Vec", arxiv.org, Cornell University Library, 201 Olin Library Cornell University Ithaca, NY 14853, May 1, 2018.

* cited by examiner

DATA PROCESSING FOR GENERATING A RANDOM WALK SEQUENCE

RELATED APPLICATIONS

This application is a continuation of International Application No. PCT/CN2020/079459, entitled "DATA PROCESSING METHOD AND APPARATUS, ELECTRONIC DEVICE, AND STORAGE MEDIUM" and filed on Mar. 16, 2020, which claims priority to Chinese Patent Application No. 201910276296.2, entitled "DATA PROCESSING METHOD AND APPARATUS" and filed on Apr. 8, 2019. The entire disclosures of the prior applications are hereby incorporated by reference in their entirety.

FIELD OF THE TECHNOLOGY

This disclosure relates to the field of data processing technologies, including a data processing method and apparatus, an electronic device, and a storage medium.

BACKGROUND OF THE DISCLOSURE

Graphs are ubiquitous in real world applications. Graphs can effectively express the association between entities, for example, the association between different accounts in social media networks, the association between products and customers in e-commerce platforms, and the association between web page information on the World Wide Web. However, a graph often corresponds to a large quantity of vertexes and a large quantity of edges, and the edges and the vertexes are associated with a large amount of metadata, such as a gender, an age, and a geographic location of a user. Therefore, higher requirements are put forward for fast and accurate graph calculation.

In related art, before graph calculation is performed on all vertexes in a graph by using a random walk algorithm, edge transition probabilities between vertexes in the graph are pre-stored based on an edge transition probability matrix. Therefore, when a random walk is performed on the vertexes in the graph, the edge transition probabilities between the vertexes can be directly obtained from the edge transition probability matrix to implement the random walk. However, due to the large quantity of vertexes contained in the graph, the edge transition probability matrix corresponding to the graph can occupy an excessively large capacity of a system.

SUMMARY

Embodiments of this disclosure include a data processing method and apparatus, an electronic device, and a non-transitory computer-readable storage medium, for example, to save memory capacity of a system in graph computing tasks.

According to one aspect of the embodiments of this disclosure, a data processing method is provided. In the method, a target walk vertex is specified in a target graph. A historical walk vertex adjacent to the target walk vertex is determined. First out-edge information transmitted from the historical walk vertex to the target walk vertex is obtained. A first out-neighbor set is obtained. The first out-neighbor set refers to a set of next possible vertexes to be walked to from the target walk vertex. An edge transition probability between the target walk vertex and each of the set of next possible vertexes in the first out-neighbor set is determined according to the first out-edge information. A to-be-reached vertex of the set of next possible vertexes in the first out-neighbor set is determined according to the edge transition probabilities. Second out-edge information corresponding to the target walk vertex is generated based on the first out-neighbor set. Walking from the target walk vertex to the to-be-reached vertex is performed. The second out-edge information is transmitted to the to-be-reached vertex. The to-be-reached vertex is determined as a new target walk vertex. Further, a random walk sequence corresponding to the target walk vertex is generated based on a walk quantity corresponding to the target walk vertex reaching a preset threshold for walk steps.

According to one aspect of the embodiments of this disclosure, a data processing apparatus is provided, including processing circuitry. The processing circuitry is configured to specify a target walk vertex in a target graph, determine a historical walk vertex adjacent to the target walk vertex, and obtain first out-edge information transmitted from the historical walk vertex to the target walk vertex. The processing circuitry is configured to obtain a first out-neighbor set. The first out-neighbor set refers to a set of next possible vertexes to be walked to from the target walk vertex. The processing circuitry is configured to determine an edge transition probability between the target walk vertex and each of the set of next possible vertexes in the first out-neighbor set according to the first out-edge information. The processing circuitry is configured to determine a to-be-reached vertex of the set of next possible vertexes in the first out-neighbor set according to the edge transition probabilities, and generate second out-edge information corresponding to the target walk vertex based on the first out-neighbor set. The processing circuitry is configured to walk from the target walk vertex to the to-be-reached vertex, transmit the second out-edge information to the to-be-reached vertex, and determine the to-be-reached vertex as a new target walk vertex. Further, the processing circuitry is configured to generate a random walk sequence corresponding to the target walk vertex based on a walk quantity corresponding to the target walk vertex reaching a preset threshold for walk steps.

According to one aspect of this disclosure, an electronic device is provided, including a processor and a memory, the processor being connected to the memory, the memory being configured to store program code, the processor being configured to invoke the program code, to perform the method according to the foregoing aspect of the embodiments of this disclosure.

According to another aspect of the embodiments of this disclosure, a non-transitory computer-readable storage medium is provided, storing instructions which when executed by a processor cause the processor to perform the foregoing method according to the foregoing aspect.

BRIEF DESCRIPTION OF THE DRAWINGS

To describe the technical solutions of the embodiments of this disclosure more clearly, the following briefly describes the accompanying drawings. The accompanying drawings in the following description show only exemplary embodiments of this disclosure, and persons skilled in the art may still derive other drawings from these accompanying drawings.

DESCRIPTION OF EMBODIMENTS

The technical solutions in embodiments of this description are described in the following description with reference to the accompanying drawings in the embodiments of this disclosure. The described embodiments are merely examples rather than all of the embodiments of this disclosure. All other embodiments obtained by a person of ordinary skill in the art based on the embodiments of this disclosure shall fall within the protection scope of this disclosure.

Figure 1A:
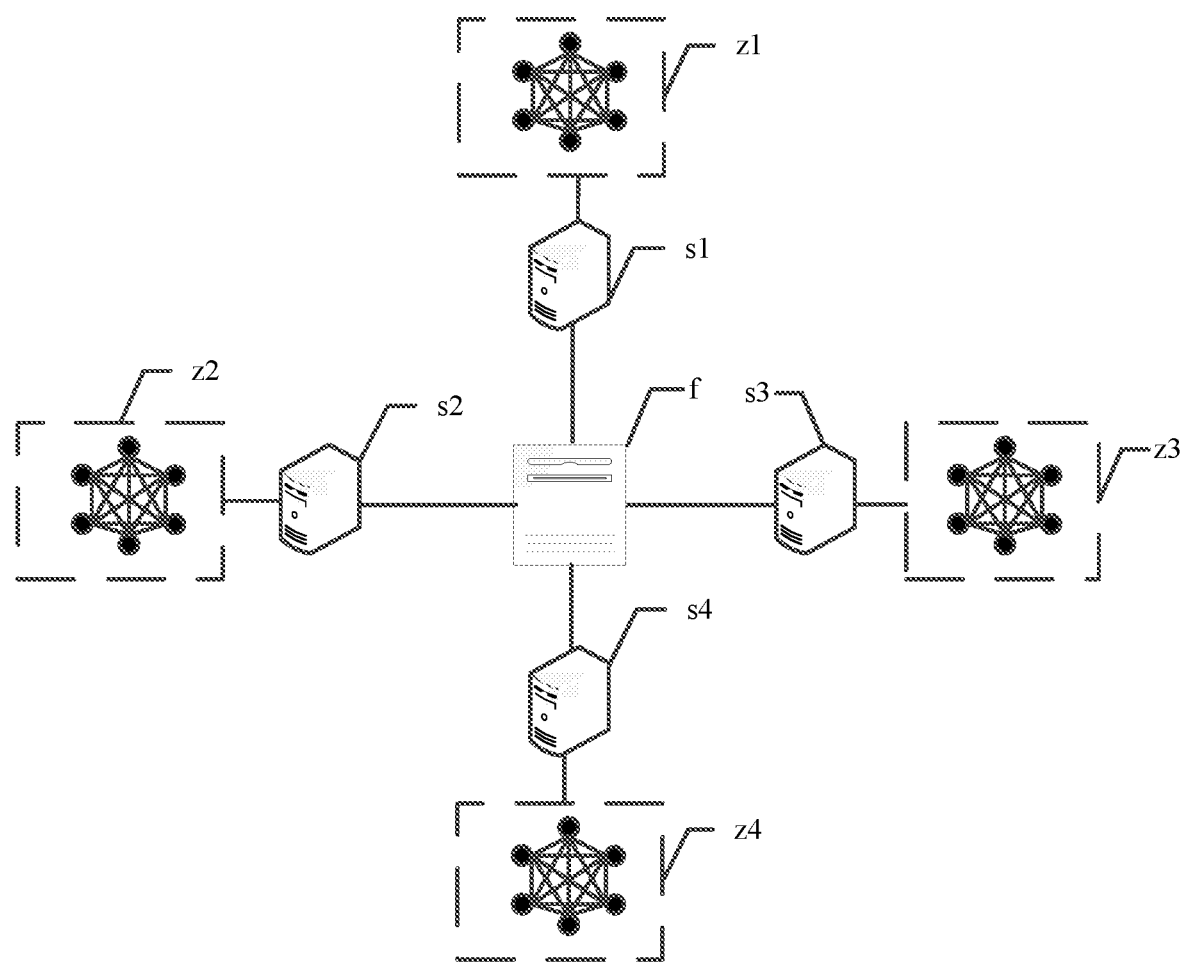
FIG. 1a is a schematic architectural diagram of distributed graph computing according to an embodiment of this disclosure.

In an embodiment of this disclosure, a graph, as a network data structure, is formed by a non-empty set of vertexes and a set describing relationships between vertexes. The relationship between vertexes is referred to as an edge. FIG. 1a is a schematic architectural diagram of distributed graph computing according to an embodiment of this disclosure. As shown in FIG. 1a, a distributed graph processing platform f can communicate with a device s1, a device s2, a device s3, and a device s4. The device s1, the device s2, the device s3, and the device s4 can communicate with each other. From the device s1 to the device s4, each device stores data associated with each vertex in a target graph. Four devices are used as an example for description herein. A specific quantity of devices is determined according to actual application scenarios, and is not limited herein.

The device s1 is associated with graph data z1, and the graph data z1 may have a plurality of vertexes; the device s2 is associated with graph data z2, and the graph data z2 may have a plurality of vertexes; the device s3 is associated with graph data z3, and the graph data z3 may have a plurality of vertexes; and the device s4 is associated with graph data z4, and the graph data z4 may have a plurality of vertexes.

All the vertexes associated with the device s1, the device s2, the device s3, and the device s4 may form a target graph, and a second-order random walk may be performed in the target graph subsequently. The "second-order random walk" refers to selecting a next vertex based on two nearest vertexes, and a parameter used is an edge-to-edge transition probability matrix.

The foregoing vertexes may each correspond to a user account, that is, data associated with the each vertex may be data information corresponding to a user account, such as user identity information and location information; in another example, the foregoing vertexes may each correspond to a category of commodities, that is, data associated with the each vertex may be data information corresponding to a category of commodities, such as sales information and origin information.

Figure 1B:
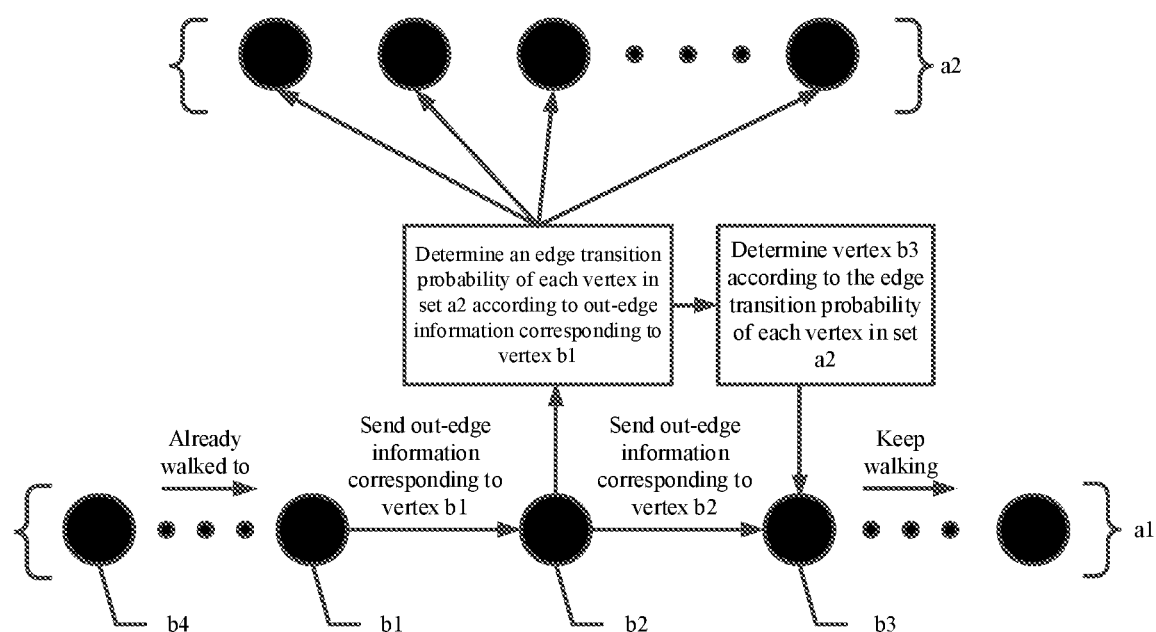
FIG. 1b is a schematic diagram of a scenario of a vertex walk process according to an embodiment of this disclosure.

FIG. 1b is a schematic diagram of a scenario of a vertex walk process according to an embodiment of this disclosure. In a second-order walk process on a distributed graph computing system, if a current vertex is an initial vertex in a second-order random walk task, a next vertex of the current vertex is determined by relevant information of the current vertex. If the current vertex is not the initial vertex in the second-order random walk task, the next vertex of the current vertex is determined by relevant information of a previous vertex of the current vertex and relevant information of the current vertex. Therefore, in this embodiment of this disclosure, a historical walk vertex b1, a target walk vertex b2, and a to-be-reached vertex b3 are used as an example to illustrate the entire second-order random walk task.

In the distributed graph computing system, a target graph is processed. The target graph includes several vertexes, each vertex corresponds to a device, and a device may correspond to a plurality of vertexes, that is, the historical walk vertex b1, the target walk vertex b2, and the to-be-reached vertex b3 each correspond to a device, and the device corresponding to the historical walk vertex b1, the device corresponding to the target walk vertex b2, and the device corresponding to the to-be-reached vertex b3 may be the same device, or may be different devices. The target walk vertex b2 is not the initial vertex of the second-order random walk task, and the historical walk vertex b1 and the target walk vertex b2 are adjacent walk vertexes.

Specifically, as shown in FIG. 1b, a walk vertex sequence a1 is a vertex sequence generated by performing the second-order random walk task with an initial walk vertex b4 as a start point. For a second-order random walk task of a target graph including several vertexes, each vertex in the target graph may be used as an initial walk vertex, and each initial walk vertex corresponds to an independent second-order random walk task. The second-order random walk tasks corresponding all the initial walk vertexes may be performed in parallel simultaneously. The second-order random walk tasks corresponding to all the initial walk vertexes are performed with respective initial walk vertexes as start points. The second-order random walk task corresponding to each of the initial walk vertexes corresponds to a determined quantity of steps. In the foregoing target graph, the second-order random walk tasks corresponding to all the initial walk vertexes constitute random walk tasks of the target graph. The second-order random walk task corresponding to each of the initial walk vertexes has the same walk rule. The walk vertex sequence a1 corresponding to the initial walk vertex b4 is used as an example for description herein.

It is assumed that the device corresponding to the historical walk vertex b1 is the device s1, the device corresponding to the target walk vertex b2 is the device s2, and the device corresponding to the to-be-reached vertex b3 is the device s3. The device s1 may generate the out-edge information corresponding to the vertex b1. The out-edge information corresponding to the vertex b1 includes identification information of the initial walk vertex b4, identification information of the historical walk vertex b1, remaining steps of the second-order random walk task corresponding to the initial walk vertex b4 determined based on a location of the historical walk vertex b1, and an out-neighbor set of the historical walk vertex b1. The out-neighbor set refers to a set of next possible vertexes to which a current vertex walks. The out-neighbor set includes several vertexes. For example, an out-neighbor set of the vertex b1 includes a vertex 1, a vertex 2, and a vertex 3, which indicates that a next possible vertex to which the vertex b1 walks is one of the vertex 1, the vertex 2, and the vertex 3.

The device s1 sends out-edge information corresponding to the vertex b1 to the device s2 corresponding to the target walk vertex b2, that is, which means walking from the historical walk vertex b1 to the target walk vertex b2. The device corresponding to each vertex may obtain an out-neighbor set of the device from the graph computing platform f associated with the distributed graph computing system, and the device s2 may obtain an out-neighbor set a2 of the target walk vertex b2 from the graph computing platform f associated with the distributed graph computing system. The device s2 obtains the out-neighbor set of the vertex b1 through the received out-edge information of the historical walk vertex b1, determines a scaling factor of each vertex in the out-neighbor set a2 according to the out-neighbor set of the vertex b1 and the out-neighbor set of the target walk vertex b2, respectively scales a weight between the each vertex in the out-neighbor set a2 and the target walk vertex b2 according to the scaling factor, and normalizes the scaled weight corresponding to the each vertex in the out-neighbor set a2, to obtain an edge transition probability between the each vertex in the out-neighbor set a2 and the target walk vertex b2.

The edge transition probability refers to a transition probability between edges corresponding to vertexes. For example, an edge transition probability between a certain vertex in the out-neighbor set a2 and the target walk vertex refers to a transition probability between an edge formed by the historical walk vertex and the target walk vertex and an edge formed by the target walk vertex and the certain vertex in the out-neighbor set a2.

A probability distribution is obtained according to the edge transition probability corresponding to each vertex in the out-neighbor set a2. According to the probability distribution, a next vertex of the target walk vertex is determined in the out-neighbor set a2, that is, the to-be-reached vertex b3 is determined. An edge transition probability from the target walk vertex b2 to the to-be-reached vertex b3 refers to a transition probability between an edge formed by the vertex b1 and the vertex b2 and an edge formed by the vertex b2 and the vertex b3.

The device s2 sends the out-edge information of the target walk vertex b2 to the device s3 corresponding to the to-be-reached vertex b3. In this case, the to-be-reached vertex b3 is determined as a new target walk vertex b3, and the target walk vertex b2 is a historical walk vertex of the new target walk vertex b3.

According to the foregoing method described, based on the device s3, the to-be-reached vertex of the target walk vertex b3 is determined according to the out-neighbor set of the vertex b2 in the out-edge information sent by the device s2 and the out-neighbor set of the target walk vertex b3, and the walk process is continued. Each subsequent vertex during the walk sequentially determines a to-be-reached vertex thereof, that is, a next vertex, to complete the random walk task corresponding to the foregoing initial walk vertex b4. A rule for each subsequent vertex to determine a next vertex thereof is consistent with the foregoing rule for determining a next vertex of the target walk vertex.

A device corresponding to a previous vertex may send corresponding out-edge information to a device corresponding to a next vertex, and the device corresponding to the next vertex may dynamically calculate an edge transition probability between a to-be-reached vertex thereof and each vertex in an out-neighbor set thereof based on the out-edge information sent by the previous vertex, thereby determining a to-be-reached vertex thereof. In this process, there is no need to pre-cache edge transition probabilities between vertexes through an edge transition probability matrix, thereby saving the system capacity.

When the foregoing random walk task of the target graph is completed, the graph processing platform f generates a random walk sequence corresponding to each initial walk vertex, and each random walk sequence includes an association between vertexes that have been walked to. A vertex may be an associated user account, and a type of the user account may be a shopping account, a communication account, a current news account, or the like. Commodities, friends, news, and the like may be recommended to the associated user account based on the association between vertexes included in the random walk sequence.

Figure 2:
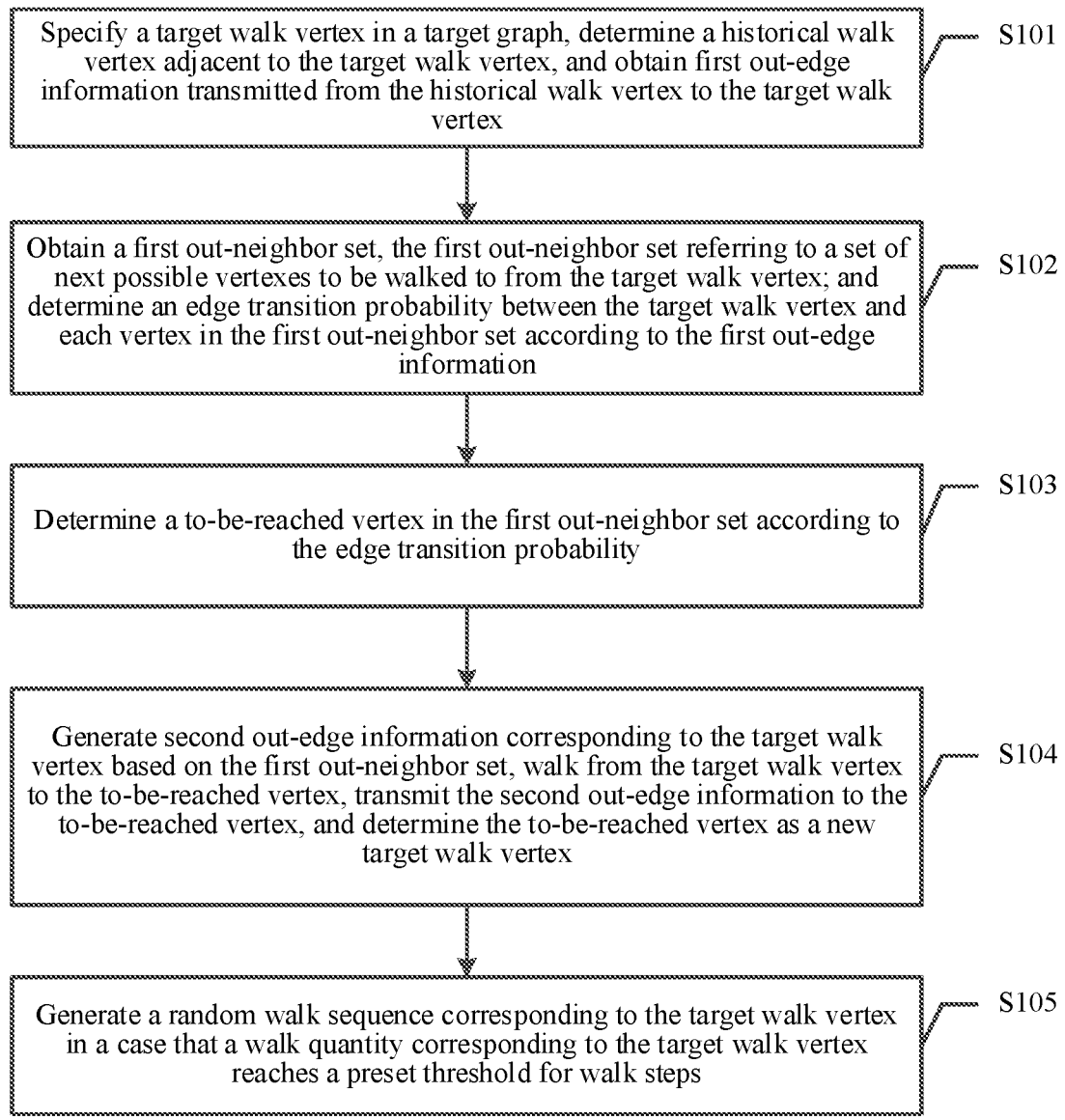
FIG. 2 is a schematic flowchart of a data processing method according to an embodiment of this disclosure.

FIG. 2 is a schematic flowchart of a data processing method according to an embodiment of this disclosure, and the method may be applied to the distributed graph processing platform f shown in FIG. 1. For ease of description, in this embodiment of this disclosure, a certain vertex in the target graph is used as an initial walk vertex, and a second-order random walk task of the initial walk vertex corresponding to the certain vertex is used as an example for description. It can be understood that the second-order random walk task corresponding to each of the initial walk vertexes in the target graph is independent. A walk rule in the second-order random walk task corresponding to each initial walk vertex in the target graph is consistent with a walk rule in the second-order random walk task of the initial walk vertex corresponding to the certain vertex.

As shown in FIG. 2, the method may include the following steps.

In step S101, a target walk vertex in a target graph is specified, a historical walk vertex adjacent to the target walk vertex is determined, and first out-edge information transmitted from the historical walk vertex to the target walk vertex is obtained.

Specifically, the target graph includes a plurality of vertexes, and a vertex is specified as the target walk vertex. For example, the initial walk vertex may be specified as the target walk vertex.

The historical walk vertex is a vertex that has been walked to before the target walk vertex, and a device corresponding to the target walk vertex receives the first out-edge information sent by a device corresponding to the historical walk vertex.

The first out-edge information corresponding to the historical walk vertex is generated by the device corresponding to the historical walk vertex. The first out-edge information includes identification information of the initial walk vertex of the current second-order random walk task, identification information of the historical walk vertex, remaining steps of the current second-order random walk task determined based on a location of the historical walk vertex, and an out-neighbor set of the historical walk vertex.

The out-neighbor set of the historical walk vertex includes a plurality of vertexes. A next walk vertex of the historical walk vertex (also referred to as a to-be-reached vertex of the historical walk vertex) is a vertex in the out-neighbor set of the historical walk vertex. Each vertex in the out-neighbor set of the historical walk vertex has a different edge transition probability, that is, a walk probability, or referred to as an access probability, with the historical walk vertex respectively.

In step S102, a first out-neighbor set is obtained, the first out-neighbor set referring to a set of next possible vertexes to be walked to from the target walk vertex; and an edge transition probability between the target walk vertex and each vertex in the first out-neighbor set is determined according to the first out-edge information.

Specifically, the first out-neighbor set refers to an out-neighbor set corresponding to the target walk vertex. The device corresponding to the target walk vertex may directly obtain the first out-neighbor set in the associated graph computing platform. A device corresponding to each vertex may obtain an out-neighbor set of the device in the associated graph computing platform.

The first out-edge information includes the out-neighbor set of the historical walk vertex. The device corresponding to the target walk vertex determines a vertex type of the each vertex in the out-neighbor set of the target walk vertex based on the out-neighbor set of the historical walk vertex and the out-neighbor set of the target walk vertex, respectively determines a scaling factor of the each vertex according to the vertex type of the each vertex, scales a weight between the each vertex and the target walk vertex according to the scaling factor of the each vertex, and normalizes the scaled weight corresponding to the each vertex, to obtain an edge transition probability between the each vertex and the target walk vertex. In the foregoing out-neighbor set of the target walk vertex, a sum of edge transition probabilities corresponding to all the vertexes is 1.

Since a complete target graph can usually include an extremely large quantity of vertexes and an extremely large quantity of edges, the edge transition probability matrix formed by the edge transition probabilities between vertexes also includes a large amount of data. In the second-order random walk task, the edge transition probabilities between vertexes are dynamically calculated in real time. Therefore, it is not necessary to store the edge transition probability matrix formed by the edge transition probabilities between vertexes, which resolves the challenge that an edge transition probability matrix with a large amount of data needs to be stored during stand-alone graph computing, and the memory capacity of the graph computing system can be saved.

In step S103, a to-be-reached vertex in the first out-neighbor set is determined according to the edge transition probability.

Specifically, based on the weight, which has been scaled according to the scaling factor, between each vertex in the first out-neighbor set and the target walk vertex, a random number is generated according to a uniform distribution, and a value range of the random number is between 0 to 1. A cumulative sum of edge transition probabilities of the each vertex is generated according to the edge transition probability corresponding to the each vertex in the first out-neighbor set. The to-be-reached vertex is determined by comparing values of the random number and the cumulative sum of edge transition probabilities of the each vertex.

Specifically, when the cumulative sum of edge transition probabilities of the each vertex is generated according to the edge transition probability corresponding to the each vertex in the first out-neighbor set, the vertexes are sorted first, and the cumulative sum of edge transition probabilities of the each vertex is determined according to an order after the sorting. In this way, two cumulative sums of edge transition probabilities of adjacent vertexes form a probability interval, and then the random number is compared with each probability interval to determine the foregoing to-be-reached vertex.

For example, the foregoing first out-neighbor set includes a vertex 1, a vertex 2, and a vertex 3, an edge transition probability between the vertex 1 and the target walk vertex is 0.2, an edge transition probability between the vertex 2 and the target walk vertex is 0.3, and an edge transition probability between the vertex 3 and the target walk vertex is 0.5. Identification information corresponding to the vertex 1 (e.g., ID information of the vertex 1) is 18, identification information of the vertex 2 is 9, and identification information of the vertex 3 is 22.

The vertex 1, the vertex 2, and the vertex 3 are sorted arbitrarily. For example, the order is the vertex 2, the vertex 1, and the vertex 3, or the order is the vertex 3, the vertex 2, and the vertex 1. A sorting rule for the vertex 1, the vertex 2, and the vertex 3 is not limited herein, and may be sorted in other orders.

In the subsequent calculation, the cumulative sum of edge transition probabilities corresponding to each vertex is calculated based on the vertex 1, the vertex 2, and the vertex 3 after sorting. For example, when the order of the vertex 1, the vertex 2, and the vertex 3 after sorting is the vertex 2, the vertex 1, and the vertex 3, cumulative sums of edge transition probabilities of the vertex 2, the vertex 1, and the vertex 3 are sequentially the edge transition probability 0.3 of the vertex 2, a sum of edge transition probabilities 0.5 of the vertex 2 and the vertex 1, and a sum of edge transition probabilities 1 of the vertex 2, the vertex 1, and the vertex 3.

The cumulative sums of edge transition probabilities respectively corresponding to the vertex 2, the vertex 1, and the vertex 3 may be understood as follows: a line segment having a length of 1 into three sub-line segments; assuming that lengths of the sub-line segments corresponding to the vertex 2, the vertex 1, and the vertex 3 are L2, L1, and L3 respectively, a range of the sub-line segment length L2 corresponding to the vertex 2 is $0<L2\leq 0.3$, a range of the sub-line segment length L1 corresponding to the vertex 1 is $0.3<L3\leq 0.5$, and a range of the sub-line segment length L3 corresponding to the vertex 3 is $0.5<L1\leq 1$.

When the foregoing random number is 0.6, it can be determined that the random number falls within the range $0.5<L1\leq 1$ of the sub-line segment length L3 corresponding to the vertex 3, and then the vertex 3 is determined as the to-be-reached vertex of the target walk vertex.

It may be determined, through binary search, a value range of the cumulative sums of edge transition probabilities that the random number falls within. The cumulative sum of edge transition probabilities corresponding to each vertex in the first out-neighbor set after sorting is an increasing sequence. Therefore, based on the binary search, a value range of the cumulative sums of edge transition probabilities that the random number falls within can be determined quickly and accurately, to determine the edge transition probability corresponding to the to-be-reached vertex according to the value range, and further determine the to-be-reached vertex.

In step S104, second out-edge information corresponding to the target walk vertex is generated based on the first out-neighbor set, walk is performed from the target walk vertex to the to-be-reached vertex, the second out-edge information is transmitted to the to-be-reached vertex, and the to-be-reached vertex is determined as a new target walk vertex.

Specifically, the device corresponding to the target walk vertex may generate the second out-edge information of the target walk vertex. The second out-edge information includes identification information of the initial walk vertex of the current second-order random walk task, identification information of the target walk vertex, remaining steps of the current second-order random walk task determined based on a location of the target walk vertex, and the first out-neighbor set of the target walk vertex.

Based on the device corresponding to the target walk vertex, the second out-edge information corresponding to the target walk vertex is sent to the device corresponding to the to-be-reached vertex, which indicates that the to-be-reached vertex is reached. The target walk vertex is referred to as a historical walk vertex of the to-be-reached vertex, and the to-be-reached vertex is referred to as a new target walk vertex. The process described in the foregoing steps S101 to S103 can be performed repeatedly, to determine a next vertex of the new target walk vertex, that is, determine a to-be-reached vertex of the new target walk vertex.

In step S105, a random walk sequence corresponding to the target walk vertex is generated in a case that a walk quantity corresponding to the target walk vertex reaches a preset threshold for walk steps.

Specifically, each vertex in the target graph corresponds to a second-order random walk task with a determined quantity of steps, and the determined quantity of steps corresponding to the second-order random walk task of the each vertex is determined according to a specific walk algorithm used in the walk process. In an embodiment, the walk quantity of the second-order random walk task corresponding to the initial walk vertex may be used as the preset threshold for walk steps.

Based on the walk rule between vertexes described above, when the walk quantity starting from the initial walk vertex reaches the preset threshold for walk steps, it indicates that the second-order random walk task corresponding to the initial walk vertex is completed. According to a sequence of walking to vertexes during the random walk, the random walk sequence corresponding to the target walk vertex is generated, that is, the random walk sequence with the initial walk vertex as the start point is generated.

A graph processing platform that implements the foregoing random walk task of the target graph may be a GraphLite (synchronous graph computing framework) platform, or a GAS (distributed graph computing) type graph processing platform.

As can be seen, in this embodiment of this disclosure, the out-edge information sent by the historical walk vertex is received by the device corresponding to the target walk vertex, to dynamically calculate the edge transition probability between the target walk vertex and each vertex in the first out-neighbor set in real time, and finally determine the to-be-reached vertex. In this process, there is no need to pre-store the edge transition probability between the target walk vertex and each vertex in the first out-neighbor set, which saves the memory capacity of the system.

Figure 3A:
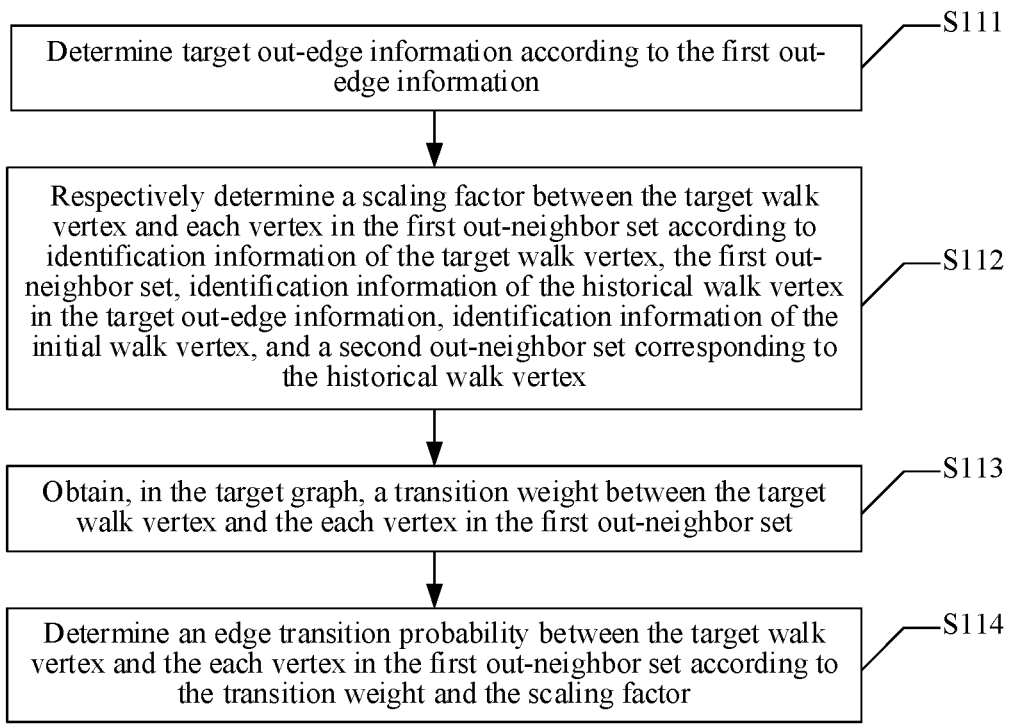
FIG. 3a is a schematic flowchart of a method for obtaining an edge transition probability according to an embodiment of this disclosure.

FIG. 3a is a schematic flowchart of a method for obtaining an edge transition probability according to an embodiment of this disclosure, and the method may be applied to the distributed graph processing platform f shown in FIG. 1. As shown in FIG. 3a, the following steps can be included.

In step S111, target out-edge information is determined according to the first out-edge information.

Specifically, the determining target out-edge information refers to determining a second out-neighbor set of the historical walk vertex, and a method for obtaining the second out-neighbor set of the historical walk vertex may be determined according to actual application scenarios.

In step S112, a scaling factor between the target walk vertex and each vertex in the first out-neighbor set is respectively determined according to identification information of the target walk vertex, the first out-neighbor set, identification information of the historical walk vertex in the target out-edge information, identification information of the initial walk vertex, and a second out-neighbor set corresponding to the historical walk vertex.

Specifically, the foregoing out-neighbor set includes the identification information (e.g., the ID of the vertex) of each vertex in the out-neighbor set. A vertex type of each vertex in the first out-neighbor set is determined according to the identification information of the historical walk vertex in the target out-edge information, the identification information of the target walk vertex, and the relationship between the identification information of the vertexes in the first out-neighbor set and the identification information of the vertexes in the second out-neighbor set. The scaling factor between the each vertex and the target walk vertex is determined according to the vertex type of the each vertex.

In step S113, in the target graph, a transition weight between the target walk vertex and the each vertex in the first out-neighbor set is obtained.

Specifically, the transition weight between the target walk vertex and the each vertex in the first out-neighbor set is obtained in the target graph. The transition weight may represent an association relationship between vertexes. A greater association relationship between one vertex and another vertex indicates a greater walk probability between the two vertexes.

In step S114, an edge transition probability between the target walk vertex and the each vertex in the first out-neighbor set is determined according to the transition weight and the scaling factor.

Figure 3B:
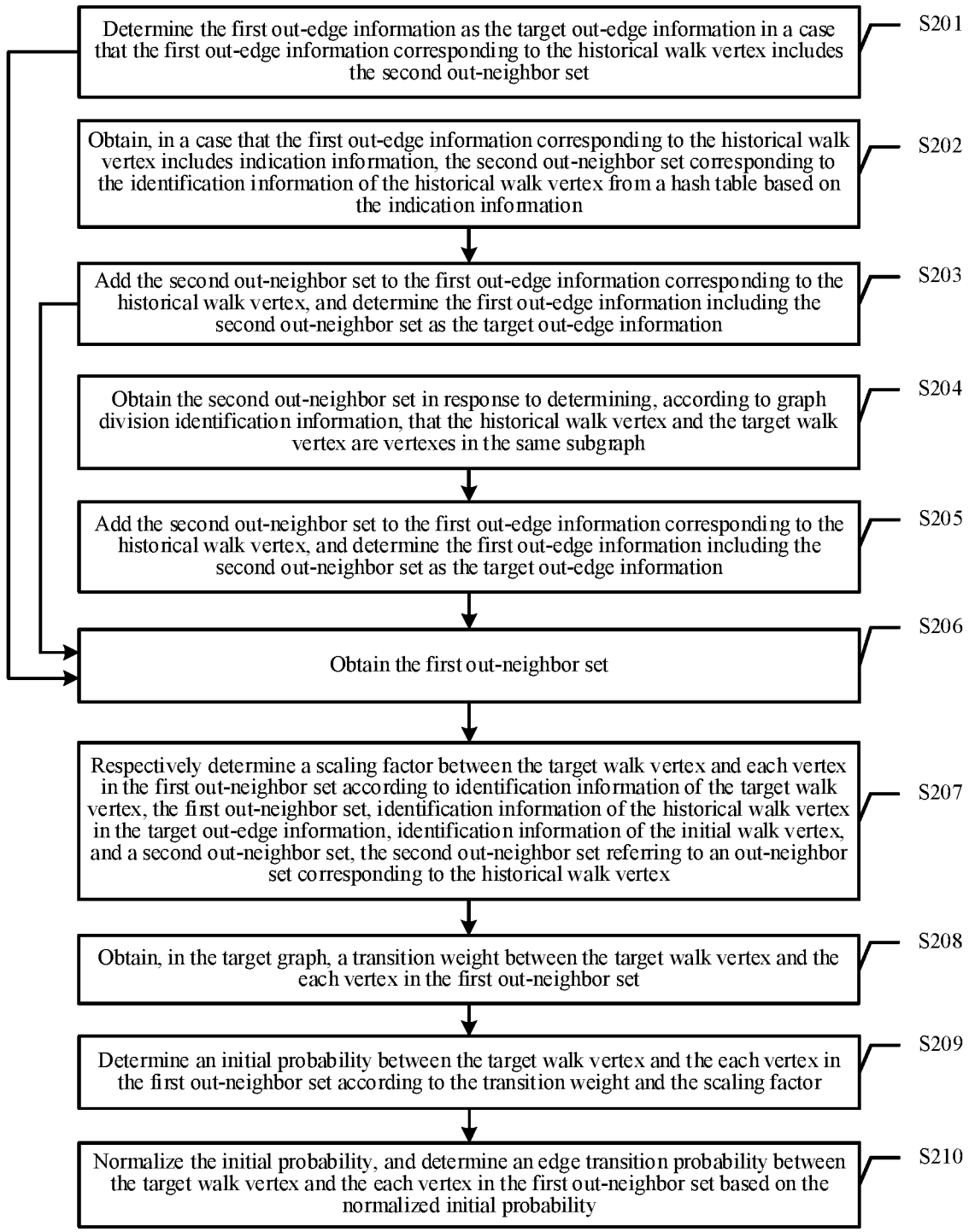
FIG. 3b is a schematic flowchart of another method for obtaining an edge transition probability according to an embodiment of this disclosure.

FIG. 3b is a schematic flowchart of another method for obtaining an edge transition probability according to an embodiment of this disclosure, and the method may be applied to the distributed graph processing platform f shown in FIG. 1.

FIG. 3b further describes three parallel methods for obtaining target out-edge information. The following step S201 describes a first method for obtaining target out-edge information, step S202 and step S203 describe a second method for obtaining target out-edge information, and step S204 and step S205 describe a third method for obtaining target out-edge information.

As shown in FIG. 3b, the method may include the following steps.

In step S201, the first out-edge information is determined as the target out-edge information in a case that the first out-edge information corresponding to the historical walk vertex includes the second out-neighbor set.

Specifically, the device corresponding to the target walk vertex may receive the out-neighbor set corresponding to the historical walk vertex sent by the device corresponding to the historical walk vertex. The out-neighbor set corresponding to the historical walk vertex may also be referred to as the second out-neighbor set, that is, the first out-edge information sent by the historical walk vertex carries the second out-neighbor set of the historical walk vertex. The first out-edge information carrying the second out-neighbor set of the historical walk vertex is directly used as the target out-edge information.

In step S202, in a case that the first out-edge information corresponding to the historical walk vertex includes indication information, the second out-neighbor set corresponding to the identification information of the historical walk vertex in a hash table is obtained based on the indication information.

Specifically, when the first out-edge information corresponding to the historical walk vertex includes the indication information, it indicates that in this case, the second out-neighbor set of the historical walk vertex is not included in the first out-edge information corresponding to the historical walk vertex. The indication information indicates that the second out-neighbor set is cached in the hash table, and the indication information is used for indicating that the device corresponding to the target walk vertex may obtain the second out-neighbor set in the hash table. The indication information is added to the first out-edge information corresponding to the historical walk vertex to replace the second out-neighbor set of the historical walk vertex, communication cost between the device corresponding to the historical walk vertex and the device corresponding to the target walk vertex can be reduced. In other words, when the device corresponding to the historical walk vertex sends the first out-edge information of the historical walk vertex to the device of the target walk vertex, there is no need to send the second out-neighbor set of the historical walk vertex; instead, indication information with a small amount of data is sent, and the indication information may be a special identifier.

Based on the foregoing indication information, the device corresponding to the target walk vertex may obtain the second out-neighbor set of the historical walk vertex from the created hash table according to the identification information of the historical walk vertex (e.g., the ID information of the historical walk vertex). The following describes the creation of the hash table under three different caching policies.

Figure 4A:
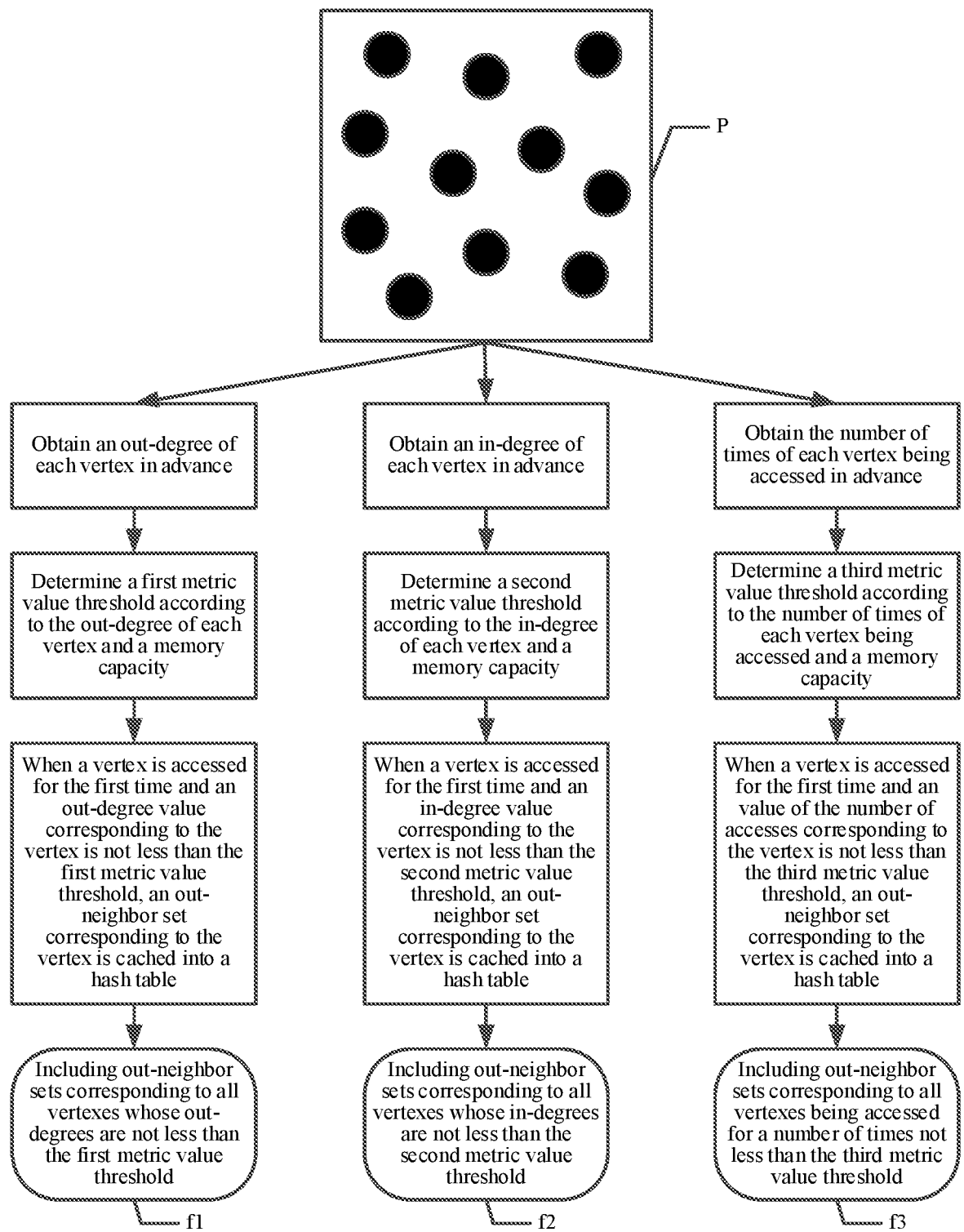
FIG. 4a is a schematic diagram of a scenario of creating a hash table according to an embodiment of this disclosure.

FIG. 4a is a schematic diagram of a scenario of creating a hash table according to an embodiment of this disclosure. As shown in FIG. 4a, three methods for creating the hash table are described, that is, three caching mechanisms for caching out-neighbor sets of vertexes based on the hash table.

Specifically, in a first method for creating a hash table, a target graph P includes several vertexes, and an out-degree of each vertex in the target graph P is obtained in advance, where an out-degree of a vertex is used for indicating a number of times that the vertex is expected to access other vertexes. A greater out-degree of a vertex indicates a greater number of times that the vertex is expected to access other vertexes.

According to the memory capacity (e.g., a data amount of out-neighbor sets that can be cached by the hash table) of the system, a maximum data amount of out-neighbor sets that can be cached is determined. Out-neighbor sets corresponding to vertexes with larger out-degree values are cached preferentially. An out-degree value corresponding to a vertex with a smallest out-degree value among a plurality of out-neighbor sets that can be cached is referred to as a first metric value threshold.

When the out-degree value reaches the first metric value threshold, it is determined that the historical walk vertex is a vertex of a high-frequency access type, and the second out-neighbor set is cached into the hash table based on the identification information of the historical walk vertex; the first metric value threshold is determined based on the memory capacity of the system and out-degree values of all vertexes in the target graph; and a plurality of out-neighbor sets corresponding to a plurality of frequently accessed vertexes in the target graph are cached in the hash table.

For example, in the second-order random walk tasks corresponding to all vertexes in the foregoing target graph, during a walk from an initial walk vertex to a vertex X, it is determined whether the vertex X is accessed for the first time. One walk corresponds to one access, that is, if the vertex X is walked to for the first time in a random walk task corresponding to an initial walk vertex, and the vertex X is not accessed in second-order random walk tasks corresponding to all other vertexes except the initial walk vertex in the target graph, it is determined that the vertex X is accessed for the first time. Further, it is determined whether an out-degree value of the vertex X is not less than the foregoing first metric value threshold, and when it is determined that the out-degree value of the vertex X is not less than the first metric value threshold, an out-neighbor set corresponding to the vertex X is cached into the foregoing hash table.

For each vertex in the foregoing target graph, it is determined whether the vertex is accessed for the first time, and out-neighbor sets corresponding to vertexes that are determined as being accessed for the first time and that have out-degree values not less than the first metric value threshold are cached into the hash table. In this way, the creation of the hash table is completed, and a hash table f1 is obtained based on the policy of caching a vertex with a maximum out-degree first.

Specifically, in a second method for creating a hash table, the target graph P includes several vertexes, and an in-degree of each vertex in the target graph P is obtained in advance, where an in-degree of a vertex is used for indicating a number of times that the vertex is expected to be accessed. A greater in-degree of a vertex indicates a greater number of times that the vertex is expected to be accessed.

According to the memory capacity (e.g., a data amount of out-neighbor sets that can be cached by the hash table) of the system, a maximum data amount of out-neighbor sets that can be cached is determined. Out-neighbor sets corresponding to vertexes with larger in-degree values are cached preferentially. An in-degree value corresponding to a vertex with a smallest in-degree value among a plurality of out-neighbor sets that can be cached is referred to as a second metric value threshold.

When the in-degree value reaches the second metric value threshold, it is determined that the historical walk vertex is a vertex of a high-frequency access type, and the second out-neighbor set is cached into the hash table based on the identification information of the historical walk vertex; the second metric value threshold is determined based on the memory capacity of the system and in-degree values of all vertexes in the target graph; and a plurality of out-neighbor sets corresponding to a plurality of frequently accessed vertexes in the target graph are cached in the hash table.

For example, in the second-order random walk tasks corresponding to all initial walk vertexes in the foregoing target graph, during a walk from an initial walk vertex to a vertex Y, it is determined whether the vertex Y is accessed for the first time. One walk corresponds to one access, that is, if the vertex Y is walked to for the first time in a random walk task corresponding to an initial walk vertex, and the vertex Y is not accessed in second-order random walk tasks corresponding to all other vertexes except the initial walk vertex in the target graph, it is determined that the vertex Y is accessed for the first time. Further, it is determined whether an in-degree value of the vertex Y is not less than the foregoing second metric value threshold, and when it is determined that the in-degree value of the vertex Y is not less than the second metric value threshold, an out-neighbor set corresponding to the vertex Y is cached into the foregoing hash table.

For each vertex in the foregoing target graph, it is determined whether the vertex is accessed for the first time, and out-neighbor sets corresponding to vertexes that are determined as being accessed for the first time and that have in-degree values not less than the second metric value threshold are cached into the hash table. In this way, the creation of the hash table is completed, and a hash table f2 is obtained based on the policy of caching a vertex with a maximum in-degree first.

Specifically, in a third method for creating a hash table, the target graph P includes several vertexes, and a number of times of each vertex is accessed in the target graph P is obtained in advance. According to the memory capacity (e.g., a data amount of out-neighbor sets that can be cached by the hash table) of the system, a maximum data amount of out-neighbor sets that can be cached is determined. Out-neighbor sets corresponding to vertexes being accessed for a greater number of times are cached preferentially. A number of access times of being accessed corresponding to a vertex accessed for a smallest number of times among a plurality of out-neighbor sets that can be cached is referred to as a third metric value threshold.

A value of the number of accesses of the historical walk vertex is obtained in response to detecting that the historical walk vertex is accessed for the first time.

When the value of the number of accesses reaches the third metric value threshold, it is determined that the historical walk vertex is a vertex of a high-frequency access type, and the second out-neighbor set is cached into the hash table based on the identification information of the historical walk vertex; the third metric value threshold is determined based on the memory capacity of the system and value of the number of accesses of all vertexes in the target graph; and a plurality of out-neighbor sets corresponding to a plurality of frequently accessed vertexes in the target graph are cached in the hash table.

For example, in the second-order random walk tasks corresponding to all initial walk vertexes in the foregoing target graph, during a walk from an initial walk vertex to a vertex Z, it is determined whether the vertex Z is accessed for the first time. One walk corresponds to one access, that is, if the vertex Z is walked to for the first time in a random walk task corresponding to an initial walk vertex, and the vertex Z is not accessed in second-order random walk tasks corresponding to all other vertexes except the initial walk vertex in the target graph, it is determined that the vertex Z is accessed for the first time. Further, it is determined whether a value of the number of times of the vertex Z being accessed is not less than the foregoing third metric value threshold, and when it is determined that the value of the number of times of the vertex Z being accessed is not less than the third metric value threshold, an out-neighbor set corresponding to the vertex Z is cached into the foregoing hash table.

For each vertex in the foregoing target graph, it is determined whether the vertex is accessed for the first time, and out-neighbor sets corresponding to vertexes that are determined as being accessed for the first time and that have values of the number of times of being accessed not less than the third metric value threshold are cached into the hash table. In this way, the creation of the hash table is completed, and a hash table f3 is obtained based on the policy of first caching a vertex accessed for a maximum number of times.

The hash table may be created by caching key-value pairs into the hash table. A key-value pair is composed of identification information of a vertex and a corresponding out-neighbor set of the vertex. The hash table is created based on random walk tasks corresponding to all initial walk vertexes in the target graph, so that the computing amount of creating the hash table can be evenly shared based on the random walk task corresponding to each initial walk vertex, which improves the efficiency of creating the hash table.

Figure 4B:
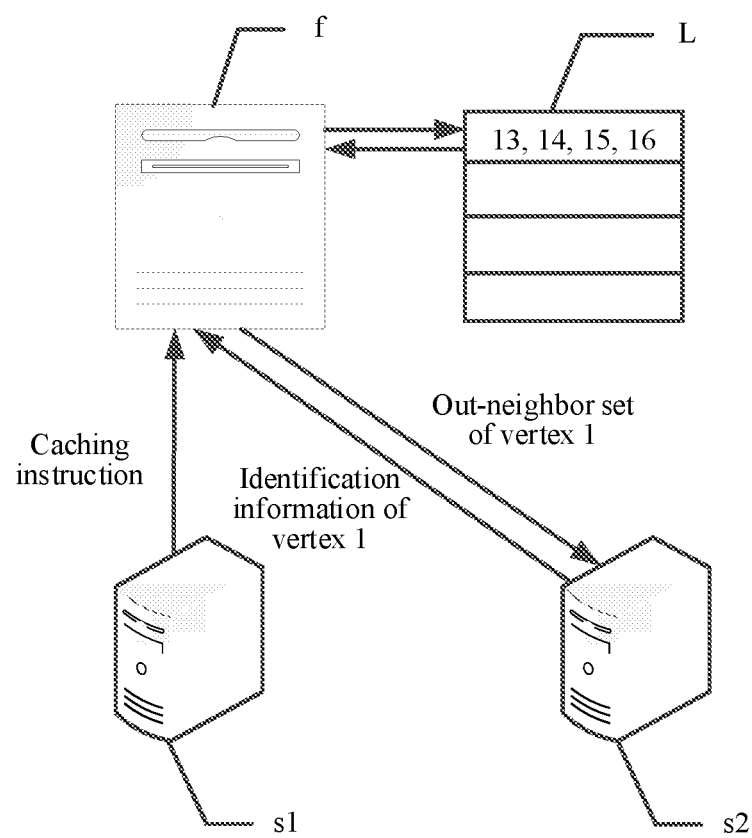
FIG. 4b is a schematic architectural diagram of obtaining an out-neighbor set according to an embodiment of this disclosure.

FIG. 4b is a schematic architectural diagram of obtaining an out-neighbor set according to an embodiment of this disclosure. A graph processing platform fin FIG. 4b is the graph processing platform f associated with the second-order random walk task of the target graph in FIG. 1a, and s1 and s2 are respectively two devices associated with the graph processing platform fin FIG. 1a. A created hash table L is cached into a caching system associated with the graph processing platform f.

As shown in FIG. 4b, in a random walk task corresponding to the device s1, when a vertex 1 corresponding to the device s1 is walked to, and the graph processing platform f detects that the vertex 1 is accessed for the first time, the graph processing platform f caches an out-neighbor set corresponding to the vertex 1 into the hash table L. Identification information of the vertex 1 is 13, and identification information of vertexes included in the out-neighbor set of the vertex 1 are 14, 15, and 16 respectively. As shown in FIG. 4b, the out-neighbor set of the vertex 1 is cached into the hash table L in the form of key-value pairs.

When the device s2 receives out-edge information sent by other devices associated with the graph processing platform f, and the out-edge information includes the identification information of the vertex 1 (e.g., the historical walk vertex is the vertex 1) and the foregoing indication information, the device s2 sends the identification information corresponding to the vertex 1 to the foregoing graph processing platform f. The graph processing platform f obtains the out-neighbor set corresponding to the vertex 1 from the hash table, and returns the out-neighbor set corresponding to the vertex 1 to the device s2.

In step S203, the second out-neighbor set is added to the first out-edge information corresponding to the historical walk vertex, and the first out-edge information including the second out-neighbor set is determined as the target out-edge information.

Specifically, the second out-neighbor set obtained in the hash table is added to the first out-edge information corresponding to the historical walk vertex. It may be determined whether to discard the foregoing indication information. The first out-edge information including the second out-neighbor set is referred to as the target out-edge information.

In step S204, the second out-neighbor set is obtained in response to determining, according to graph division identification information, that the historical walk vertex and the target walk vertex are vertexes in the same subgraph.

Specifically, the foregoing target graph may be divided into a plurality of subgraphs, and each subgraph includes a plurality of vertexes. Devices corresponding to vertexes in the same subgraph may mutually obtain an out-neighbor set corresponding to any vertex in the subgraph. The graph division identification information is used for identifying that the target walk vertex and the historical walk vertex belong to the same subgraph. A subgraph may refer to a device, that is, vertexes belonging to the same device belong to the same subgraph. The subgraph division of the target graph is completed before the random walk task of the target graph begins. When it is determined according to the graph division identification information that the historical walk vertex and the target walk vertex belong to the same subgraph, the second out-neighbor set corresponding to the historical walk vertex is obtained in the associated graph computing platform based on the device corresponding to the target walk vertex.

In step S205, the second out-neighbor set is added to the first out-edge information corresponding to the historical walk vertex, and the first out-edge information including the second out-neighbor set is determined as the target out-edge information.

Specifically, the obtained second out-neighbor set is added to the first out-edge information corresponding to the historical walk vertex. It may be determined whether to discard the foregoing graph division identification information. The first out-edge information including the second out-neighbor set is referred to as the target out-edge information.

Figure 5:
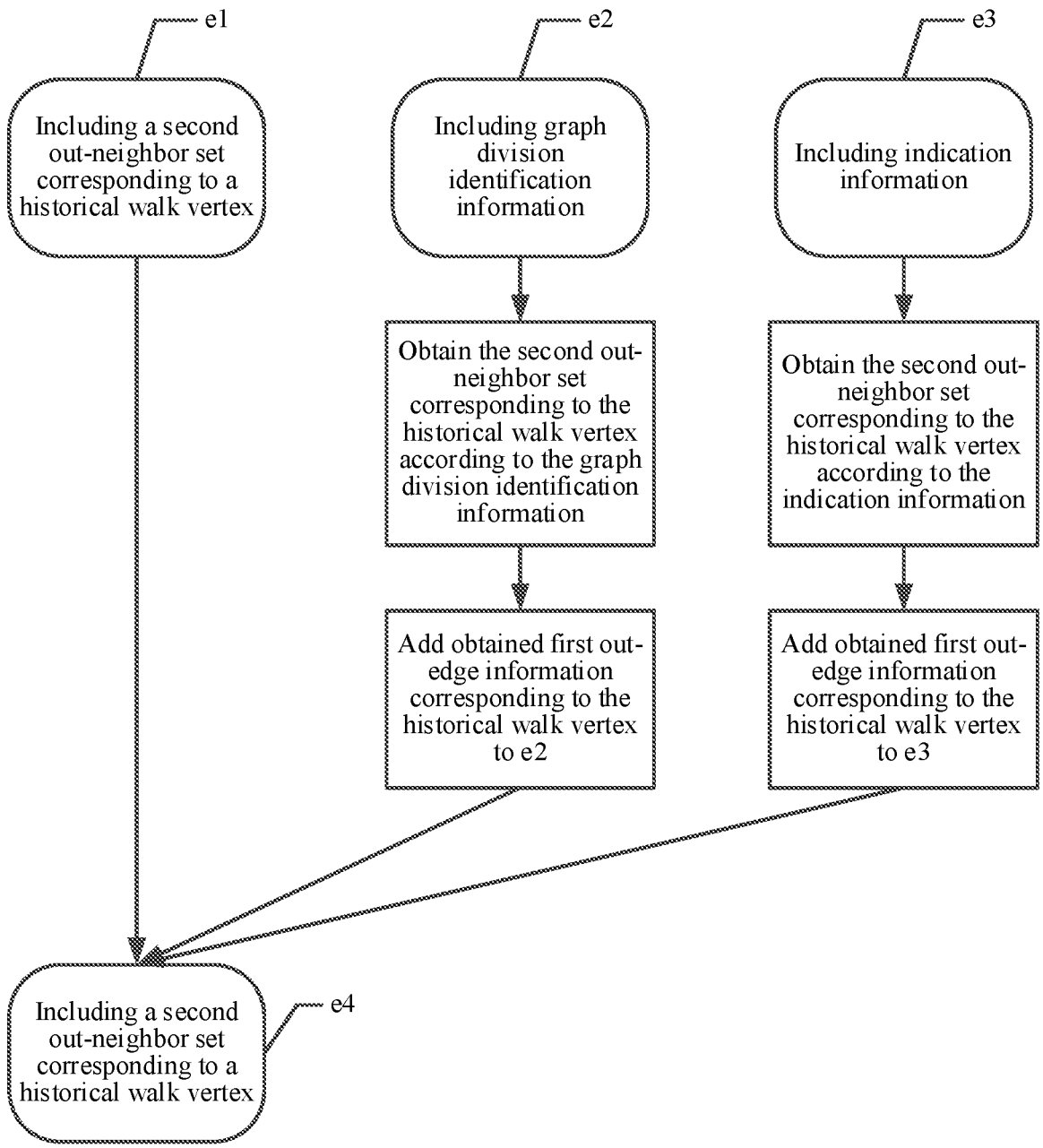
FIG. 5 is a schematic diagram of a scenario of determining target out-edge information according to an embodiment of this disclosure.

FIG. 5 is a schematic diagram of a scenario of determining target out-edge information according to an embodiment of this disclosure. As shown in FIG. 5, three methods for obtaining target out-edge information are provided, which correspond to first out-edge information corresponding to three types of historical walk vertexes sent by the device corresponding to the historical walk vertex. e1, e2, and e3 are respectively first out-edge information sent by the device corresponding to the historical walk vertex to the device corresponding to the target walk vertex. The first out-edge information e1 that already includes the second out-neighbor set corresponding to the historical walk vertex is directly referred to as the target out-edge information e4.

The first out-edge information e2 includes the graph division identification information. When it is determined according to the graph division identification information that the historical walk vertex and the target walk vertex belong to the same subgraph, the second out-neighbor set corresponding to the historical walk vertex is obtained in the associated graph computing platform based on the device corresponding to the target walk vertex. The obtained second out-neighbor set is added to the first out-edge information e2, and the first out-edge information e2 including the second out-neighbor set is referred to as the target out-edge information e4.

The first out-edge information e3 includes the indication information. Based on the indication information, the second out-neighbor set corresponding to the historical walk vertex is obtained in the hash table according to the identification information corresponding to the historical walk vertex. The obtained second out-neighbor set is added to the first out-edge information e3, and the first out-edge information e3 including the second out-neighbor set is referred to as the target out-edge information e4.

In step S206, the first out-neighbor set is obtained.

Specifically, the device corresponding to the target walk vertex obtains the first out-neighbor set corresponding to the target walk vertex in the associated graph computing platform. A device corresponding to each vertex may statically obtain out-neighbor information thereof in the associated graph computing platform.

In step S207, a scaling factor between the target walk vertex and each vertex in the first out-neighbor set is respectively determined according to identification information of the target walk vertex, the first out-neighbor set, identification information of the historical walk vertex in the target out-edge information, identification information of the initial walk vertex, and the second out-neighbor set.

In step S208, in the target graph, a transition weight between the target walk vertex and the each vertex in the first out-neighbor set is obtained.

For example, the first out-neighbor set includes a vertex 1 and a vertex 2, a transition weight between the vertex 1 and the target walk vertex is 2, and a transition weight between the vertex 2 and the target walk vertex is 3.

In step S209, an initial probability between the target walk vertex and the each vertex in the first out-neighbor set is determined according to the transition weight and the scaling factor.

Specifically, the transition weight corresponding to the each vertex is respectively scaled according to the scaling factor corresponding to the each vertex in the first out-neighbor set, that is, the transition weight and the scaling factor corresponding to the each vertex are multiplied. The scaled transition weight is referred to as the initial probability. A value range of the initial probability may be greater than 1.

In step S210, the initial probability is normalized, and an edge transition probability between the target walk vertex and the each vertex in the first out-neighbor set is determined based on the normalized initial probability.

Specifically, the initial probability corresponding to each vertex is normalized to obtain the edge transition probability between the each vertex and the target walk vertex. A sum of edge transition probabilities corresponding to all the vertexes is 1.

Figure 6:
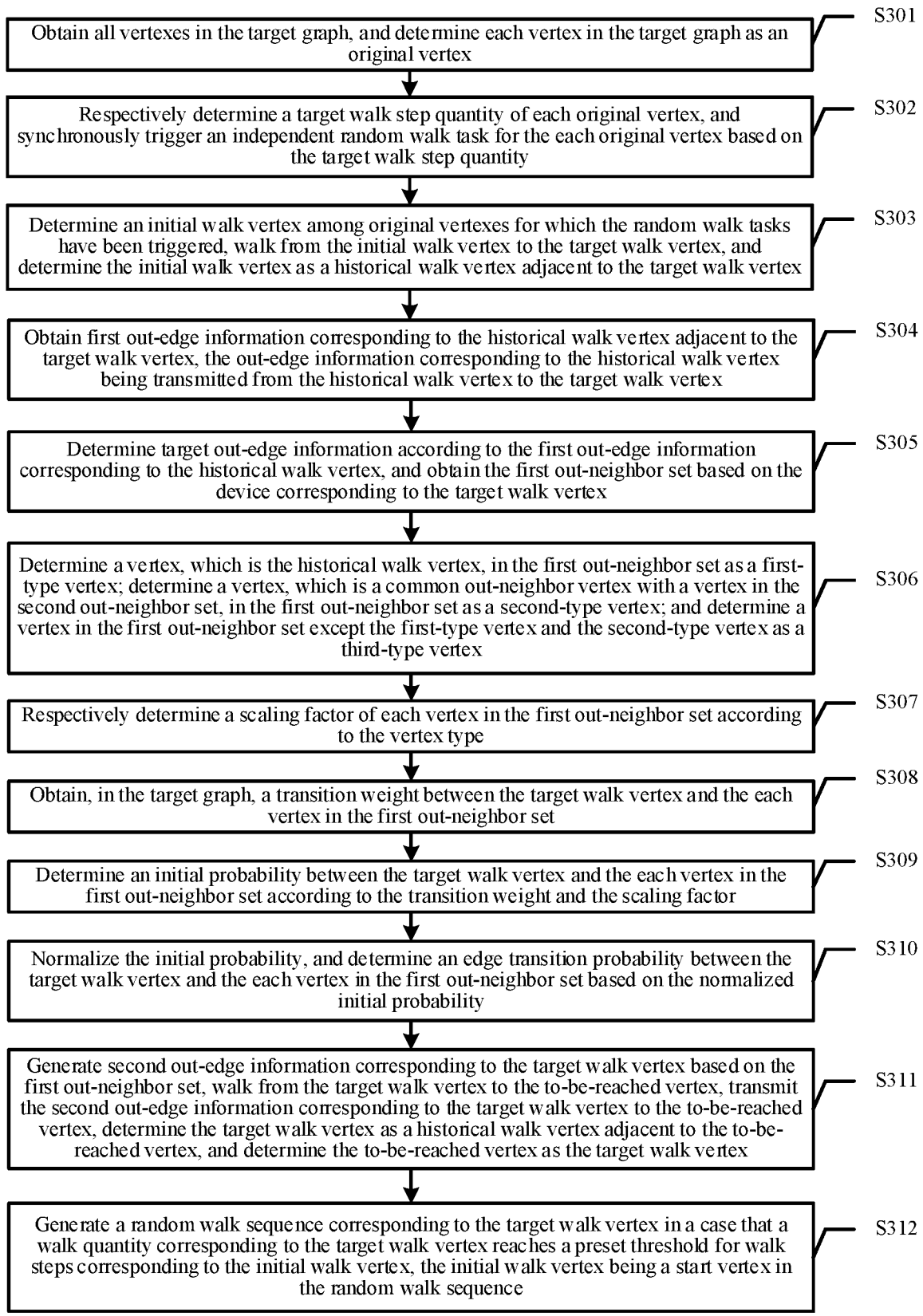
FIG. 6 is a schematic flowchart of another data processing method according to an embodiment of this disclosure.

FIG. 6 is a schematic flowchart of another data processing method according to an embodiment of this disclosure, and the method may be applied to the distributed graph processing platform f shown in FIG. 1. As shown in FIG. 6, the method may include the following steps:

In step S301, all vertexes in the target graph are obtained, and each vertex in the target graph is determined as an original vertex.

In step S302, a target walk step quantity of each original vertex is respectively determined, and an independent random walk task is synchronously triggered for the each original vertex based on the target walk step quantity.

Specifically, based on a random walk algorithm specifically used in the random walk task, a target walk step quantity of each original vertex in the target graph is determined separately. According to the target walk step quantity corresponding to the each original vertex, a random walk task that uses the each original vertex as a start vertex and that has the corresponding target walk step quantity is triggered simultaneously. The random walk tasks corresponding to the original vertexes are independent of each other, and are simultaneously performed in parallel.

The above random walk algorithm may be any determined second-order random walk algorithm such as a Node2Vec algorithm (an algorithm that uses vector modeling for nodes in a graph), a second-order PageRank algorithm (a link analysis algorithm), a second-order SimRank algorithm (a collaborative filtering recommendation algorithm), or a second-order RWR algorithm (a restart random walk algorithm).

In step S303, the initial walk vertex among original vertexes for which the random walk tasks have been triggered is determined, walk is performed from the initial walk vertex to the target walk vertex, and the initial walk vertex is determined as a historical walk vertex adjacent to the target walk vertex.

Specifically, the initial walk vertex is determined among original vertexes for which the random walk tasks have been triggered, and each of the original vertexes for which the random walk tasks have been triggered may be determined as the initial walk vertex.

In step S304, first out-edge information corresponding to the historical walk vertex adjacent to the target walk vertex is obtained, the out-edge information corresponding to the historical walk vertex being transmitted from the historical walk vertex to the target walk vertex.

Specifically, the first out-edge information corresponding to the initial walk vertex sent by the device of the initial walk vertex is obtained.

In step S305, target out-edge information is determined according to the first out-edge information corresponding to the historical walk vertex, and the first out-neighbor set is obtained.

For the specific implementation of step S305, reference may be made to the descriptions of steps S201 to S207 in the embodiment corresponding to FIG. 3b, and details are not described herein again.

In step S306, a vertex, which is the historical walk vertex, in the first out-neighbor set is determined as a first-type vertex; a vertex, which is a common out-neighbor vertex with a vertex in the second out-neighbor set, in the first out-neighbor set is determined as a second-type vertex; and a vertex in the first out-neighbor set except the first-type vertex and the second-type vertex is determined as a third-type vertex.

Specifically, the first out-neighbor set includes identification information of all vertexes that may be walked to from the target walk vertex, and the second out-neighbor set includes identification information of all vertexes that may be walked to from the historical walk vertex. In the first out-neighbor set, a vertex whose identification information is consistent with the identification information of the historical walk vertex is referred to as the first-type vertex, that is, the first out-neighbor set includes the historical walk vertex, and a vertex that is the historical walk vertex is determined as the first-type vertex.

In the first out-neighbor set, a common vertex whose identification information is the same as identification information of a vertex in the second out-neighbor set is referred to as the second-type vertex, that is, the same vertex (common vertex) included in the first out-neighbor set and the second out-neighbor set is determined as the second-type vertex. The vertex in the out-neighbor set except the first-type vertex and the second-type vertex is referred to as the third-type vertex.

In step S307, a scaling factor of each vertex in the first out-neighbor set is respectively determined according to the vertex type.

Specifically, there are different scaling factors for different types of vertexes in the first out-neighbor set, and the scaling factor of the each vertex is determined according to the vertex type of the each vertex in the first out-neighbor set. For example, a scaling factor corresponding to the first-type vertex is 1, a scaling factor corresponding to the second-type vertex is ½, and a scaling factor corresponding to the third-type vertex is ⅕.

In step S308, in the target graph, a transition weight between the target walk vertex and the each vertex in the first out-neighbor set is obtained.

In step S309, an initial probability between the target walk vertex and the each vertex in the first out-neighbor set is determined according to the transition weight and the scaling factor.

In step S310, the initial probability is normalized, and an edge transition probability between the target walk vertex and the each vertex in the first out-neighbor set is determined based on the normalized initial probability.

For the specific implementation of steps S308 to S310, reference may be made to the descriptions of steps S209 to S211 in the embodiment corresponding to FIG. 3b, and details are not described herein again.

In step S311, second out-edge information corresponding to the target walk vertex is generated based on the first out-neighbor set, walk is performed from the target walk vertex to a to-be-reached vertex, the second out-edge information is transmitted to the to-be-reached vertex, the target walk vertex is determined as a historical walk vertex adjacent to the to-be-reached vertex, and the to-be-reached vertex is determined as the target walk vertex.

In step S312, a random walk sequence corresponding to the target walk vertex is generated in a case that a walk quantity corresponding to the target walk vertex reaches a preset threshold for walk steps corresponding to the initial walk vertex, the initial walk vertex being a start vertex in the random walk sequence.

For the specific implementation of steps S311 and S312, reference may be made to the descriptions of steps S104 and S105 in the embodiment corresponding to FIG. 2, and details are not described herein again.

As can be seen, in this embodiment of this disclosure, the out-edge information sent by the historical walk vertex is received by the device corresponding to the target walk vertex, to dynamically calculate the edge transition probability between the target walk vertex and each vertex in the first out-neighbor set in real time, and finally determine the to-be-reached vertex. In this process, there is no need to pre-store the edge transition probability between the target walk vertex and each vertex in the first out-neighbor set, which saves the memory capacity of the system.

Figure 7A:
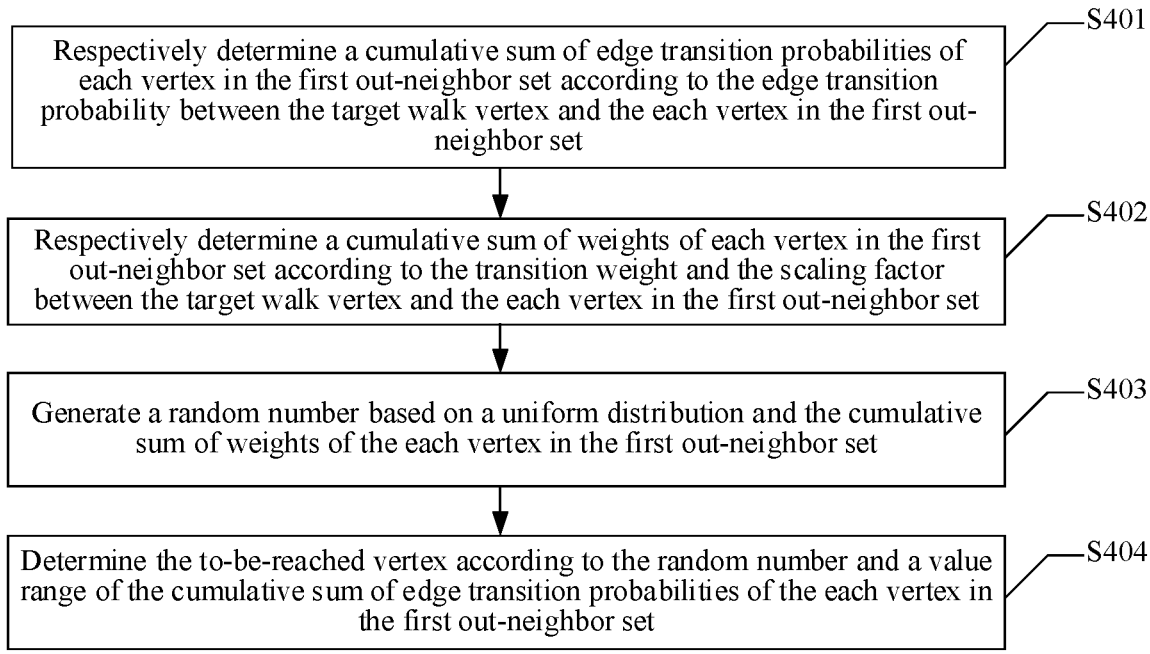
FIG. 7a is a schematic flowchart of a method for determining a to-be-reached vertex according to yet another embodiment of this disclosure.

On the basis of determining the transition weight and the scaling factor in FIG. 3b, FIG. 7a is a schematic flowchart of a method for determining a to-be-reached vertex according to yet another embodiment of this disclosure, and the method may be applied to the distributed graph processing platform f shown in FIG. 1. As shown in FIG. 7a, the method may include steps as follows.

In step S401, a cumulative sum of edge transition probabilities of each vertex in the first out-neighbor set is respectively determined according to the edge transition probability between the target walk vertex and the each vertex in the first out-neighbor set.

Specifically, for example, vertexes in the first out-neighbor set after sorting are a vertex 1, a vertex 2, and a vertex 3, where an edge transition probability between the vertex 1 and the target walk vertex is 0.3, an edge transition probability between the vertex 2 and the target walk vertex is 0.4, and an edge transition probability between the vertex 3 and the target walk vertex is 0.3. Then, cumulative sums of edge transition probabilities corresponding to the vertex 1, the vertex 2, and the vertex 3 are respectively the edge transition probability 0.3 corresponding to the vertex 1, a sum of edge transition probabilities 0.7 corresponding to the vertex 1 and the vertex 2, and a sum of edge transition probabilities 1 corresponding to the vertex 1, the vertex 2, and the vertex 3.

In step S402, a cumulative sum of weights of the each vertex in the first out-neighbor set is respectively determined according to the transition weight and the scaling factor between the target walk vertex and the each vertex in the first out-neighbor set.

Figure 7B:
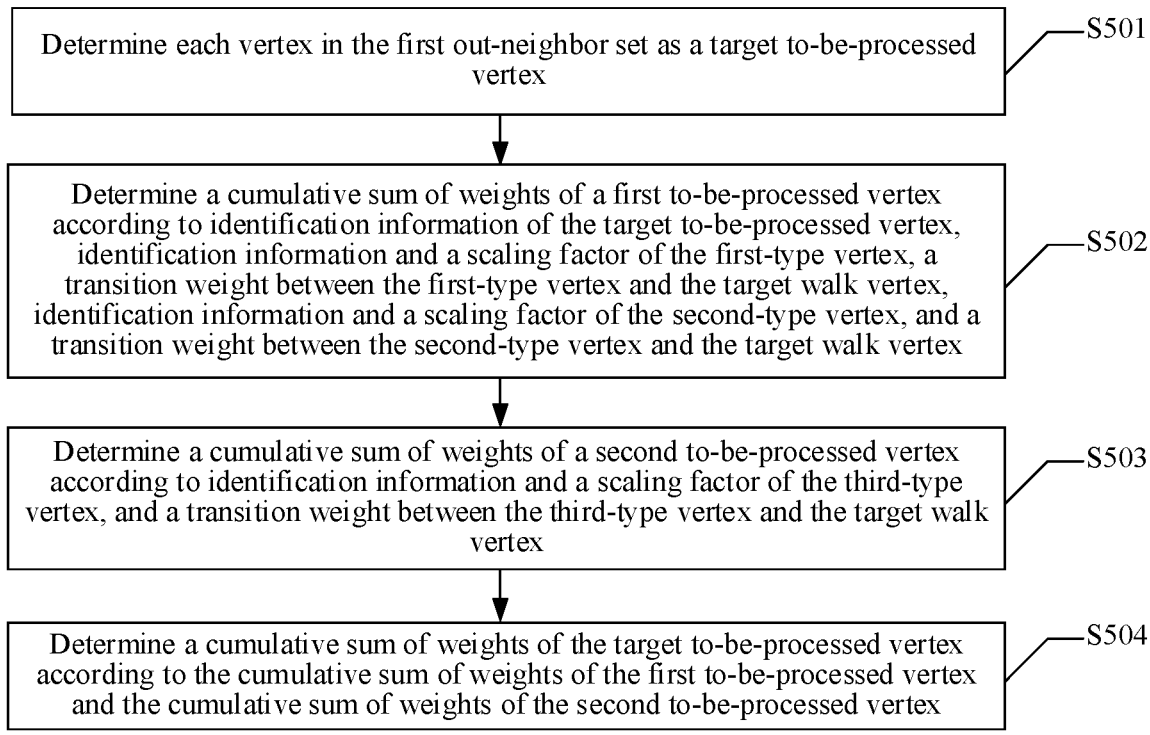
FIG. 7b is a schematic flowchart of a method for determining a cumulative sum of weights of each vertex according to an embodiment of this disclosure.

FIG. 7b is a schematic flowchart of a method for determining a cumulative sum of weights of each vertex according to an embodiment of this disclosure, and the method may be applied to the distributed graph processing platform f shown in FIG. 1. As shown in FIG. 7b, the method may include the following steps.

In step S501, each vertex in the first out-neighbor set is determined as a target to-be-processed vertex.

Specifically, the target to-be-processed vertex is determined in the first out-neighbor set, and the target to-be-processed vertex may be any vertex in the first out-neighbor set.

In step S502, a cumulative sum of weights of a first to-be-processed vertex is determined according to identification information of the target to-be-processed vertex, identification information and a scaling factor of the first-type vertex, a transition weight between the first-type vertex and the target walk vertex, identification information and a scaling factor of the second-type vertex, and a transition weight between the second-type vertex and the target walk vertex.

In step S503, a cumulative sum of weights of a second to-be-processed vertex is determined according to identification information and a scaling factor of the third-type vertex, and a transition weight between the third-type vertex and the target walk vertex.

In step S504, a cumulative sum of weights of the target to-be-processed vertex is determined according to the cumulative sum of weights of the first to-be-processed vertex and the cumulative sum of weights of the second to-be-processed vertex.

Specifically, a result obtained by adding the cumulative sum of weights of the first to-be-processed vertex and the cumulative sum of weights of the second to-be-processed vertex is referred to as the cumulative sum of weights of the target to-be-processed vertex.

In this way, each vertex in the first out-neighbor set is used as the target to-be-processed vertex, and the cumulative sum of weights corresponding to each vertex in the first out-neighbor set is obtained through the method described in steps S501 to S504.

In step S403, a random number is generated based on a uniform distribution and the cumulative sum of weights of the each vertex in the first out-neighbor set.

Specifically, based on the probability distribution determined by the cumulative sum of weights of each vertex in the first out-neighbor set, the random number is generated according to the uniform distribution, and the value range of the random number is 0 to 1.

In step S404, the to-be-reached vertex is determined according to the random number and a value range of the cumulative sum of edge transition probabilities of the each vertex in the first out-neighbor set.

Figure 7C:
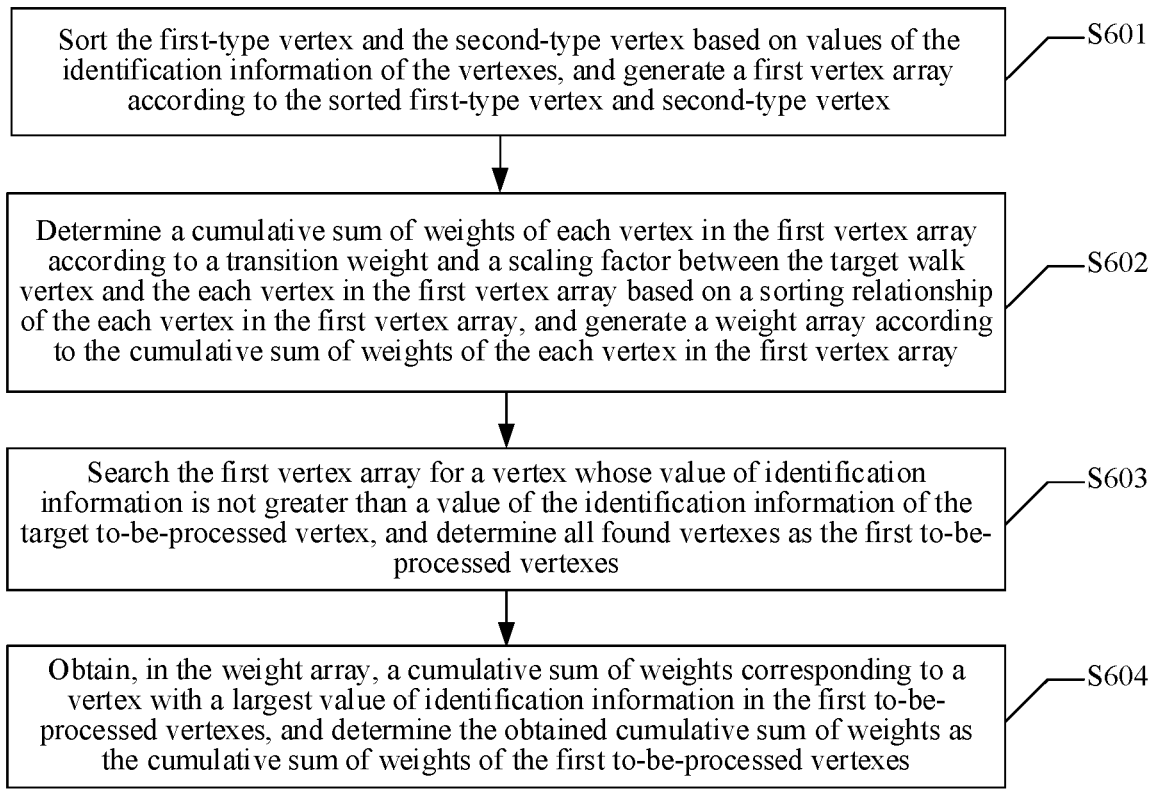
FIG. 7c is a schematic flowchart of a method for determining a cumulative sum of weights of a first to-be-processed vertex according to an embodiment of this disclosure.

For the foregoing step 502, FIG. 7c is a schematic flowchart of a method for determining a cumulative sum of weights of a first to-be-processed vertex according to an embodiment of this disclosure, and the method may be applied to the distributed graph processing platform f shown in FIG. 1. As shown in FIG. 7c, the method may include the following steps.

In step S601, the first-type vertex and the second-type vertex are sorted based on values of the identification information of the vertexes, and a first vertex array is generated according to the sorted first-type vertex and second-type vertex.

Specifically, according to the values of the identification information of the vertexes, the identification information corresponding to the first-type vertex and the identification information corresponding to the second-type vertex in the first out-neighbor set are sorted in ascending order, and a sequence formed by the identification information of the first-type vertex and the second-type vertex after the sorting is referred to as the first vertex array.

Starting from a first piece of identification information in the first vertex array, an index is added to each piece of identification information, where the index is used for searching for corresponding identification information in the first vertex array. For example, the first vertex array includes a vertex 1, a vertex 2, and a vertex 3, and an order of the vertex 1, the vertex 2, and the vertex 3 after sorting is the vertex 2, the vertex 1, and the vertex 3 in the first vertex array. Starting from 0, an index is added to each vertex after the sorting, that is, index values of the vertex 2, the vertex 1, and the vertex 3 are 0, 1, and 2, respectively.

In step S602, a cumulative sum of weights of each vertex in the first vertex array is determined according to a transition weight and a scaling factor between the target walk vertex and the each vertex in the first vertex array based on a sorting relationship of the each vertex in the first vertex array, and a weight array is generated according to the cumulative sum of weights of the each vertex in the first vertex array.

Specifically, the transition weight corresponding to the each vertex is scaled according to the scaling factor corresponding to the each vertex in the first vertex array, that is, the transition weight and the scaling factor corresponding to the each vertex are multiplied. The transition weight that is multiplied by the scaling factor is referred to as a new transition weight corresponding to the each vertex. Based on the sorting relationship of the each vertex in the first vertex array, the cumulative sum of weights of the each vertex in the first vertex array is obtained according to the new transition weight corresponding to the each vertex, and the weight array is generated according to the sorting relationship of the each vertex in the first vertex array and the cumulative sum of weights of the each vertex.

For example, the first vertex array includes a vertex 1, a vertex 2, and a vertex 3, and an order of the vertex 1, the vertex 2, and the vertex 3 after sorting is the vertex 2, the vertex 1, and the vertex 3 in the first vertex array. A transition weight and a scaling factor corresponding to the vertex 2 are 1 and 0.5 respectively; a transition weight and a scaling factor corresponding to the vertex 1 are 2 and 0.8 respectively; and a transition weight and a scaling factor corresponding to the vertex 3 are 2 and 0.5 respectively. In this case, new transition weights corresponding to the vertex 2, the vertex 1, and the vertex 3 are 0.5, 1.6, and 1 respectively; cumulative sums of weights corresponding to the vertex 2, the vertex 1, and the vertex 3 are respectively the new transition weight 0.5 of the vertex 2, a sum of new transition weights 2.1 of the vertex 2 and the vertex 1, and a sum of new transition weights 3.1 of the vertex 2, the vertex 1, and the vertex 3; the obtained weight array is 0.5, 2.1, and 3.1.

In step S603, the first vertex array is searched for a vertex whose value of identification information is not greater than a value of the identification information of the target to-be-processed vertex, and all found vertexes are determined as the first to-be-processed vertexes.

Specifically, all vertexes whose identification information is not greater than the identification information of the target to-be-processed vertex are searched for in the first vertex array as the first to-be-processed vertexes.

In step S604, in the weight array, a cumulative sum of weights corresponding to a vertex with a largest value of identification information in the first to-be-processed vertexes is obtained, and the obtained cumulative sum of weights is determined as the cumulative sum of weights of the first to-be-processed vertexes.

Specifically, by determining an index value corresponding to the cumulative sum of weights of the first to-be-processed vertex, the cumulative sum of weights of the first to-be-processed vertex may be found in the weight array according to the determined index value. For example, the weight array is denoted by aws[k], where k is an index value of each piece of identification information, and a value range of k is 0, 1, 2 . . . n sequentially. A vertex with the largest value of identification information in the first to-be-processed vertexes is the third vertex, that is, it is determined that an index value corresponding to the cumulative sum of weights of the first to-be-processed vertex is 2. Therefore, the cumulative sum of weights of the first to-be-processed vertex obtained in the weight array is aws[2].

Figure 7D:
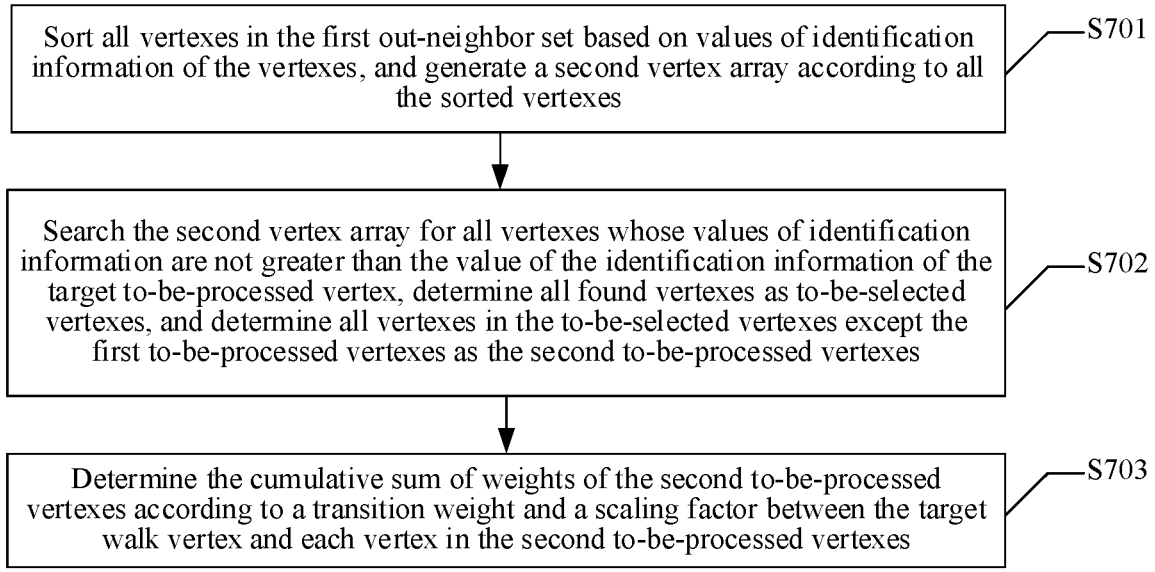
FIG. 7d is a schematic flowchart of a method for determining a cumulative sum of weights of a second to-be-processed vertex according to an embodiment of this disclosure.

For the foregoing step 503, FIG. 7d is a schematic flowchart of a method for determining a cumulative sum of weights of a second to-be-processed vertex according to an embodiment of this disclosure, and the method may be applied to the distributed graph processing platform f shown in FIG. 1. As shown in FIG. 7d, the method may include the following steps.

In step S701, all vertexes in the first out-neighbor set are sorted based on values of identification information of the vertexes, and a second vertex array is generated according to all the sorted vertexes.

Specifically, according to the value of the identification information of each vertex in the first out-neighbor set, sorting is performed in ascending order. The each vertex after sorting is expressed based on the identification information of the each vertex. An array formed by the identification information of the each vertex after sorting is referred to as the second vertex array.

In step S702, the second vertex array is searched for all vertexes whose values of identification information are not greater than the value of the identification information of the target to-be-processed vertex, all found vertexes are determined as to-be-selected vertexes, and all vertexes in the to-be-selected vertexes except the first to-be-processed vertexes are determined as the second to-be-processed vertexes.

In step S703, the cumulative sum of weights of the second to-be-processed vertexes is determined according to a transition weight and a scaling factor between the target walk vertex and each vertex in the second to-be-processed vertexes.

Specifically, each of the second to-be-processed vertexes obtained is the third-type vertex described above, and scaling factors corresponding to the second to-be-processed vertexes are the same. The transition weight corresponding to each vertex is scaled separately according to the scaling factor corresponding to the each vertex. The scaled transition weight corresponding to each vertex is referred to as a new transition weight corresponding to the each vertex, and a sum of obtained new transition weights corresponding to the each vertex is referred to as the cumulative sum of weights of the second to-be-processed vertex.

For step S404, the to-be-reached vertex is determined according to the random number and a value range of the cumulative sum of edge transition probabilities of each vertex in the first out-neighbor set. Specifically, for example, the foregoing first out-neighbor set includes a vertex 1, a vertex 2, and a vertex 3; in this case, cumulative sums of edge transition probabilities of the vertex 1, the vertex 2, and the vertex 3 are sequentially 0.3, 0.7, and 1.

The cumulative sums of edge transition probabilities respectively corresponding to the vertex 1, the vertex 2, and the vertex 3 may be understood as follows: a line segment having a length of 1 is divided into three sub-line segments; assuming that lengths of the sub-line segments corresponding to the vertex 1, the vertex 2, and the vertex 3 are L1, L2, and L3 respectively, a range of the sub-line segment length L1 corresponding to the vertex 1 is 0<L1≤0.3, a range of the sub-line segment length L2 corresponding to the vertex 2 is 0.3<L2≤0.7, and a range of the sub-line segment length L3 corresponding to the vertex 3 is 0.7<L3≤1. When the foregoing random number is 0.3, it can be determined that the random number falls within the range 0<L1≤0.3 of the sub-line segment length L1 corresponding to the vertex 1, and then the vertex 1 is determined as the to-be-reached vertex of the target walk vertex.

Figure 8:
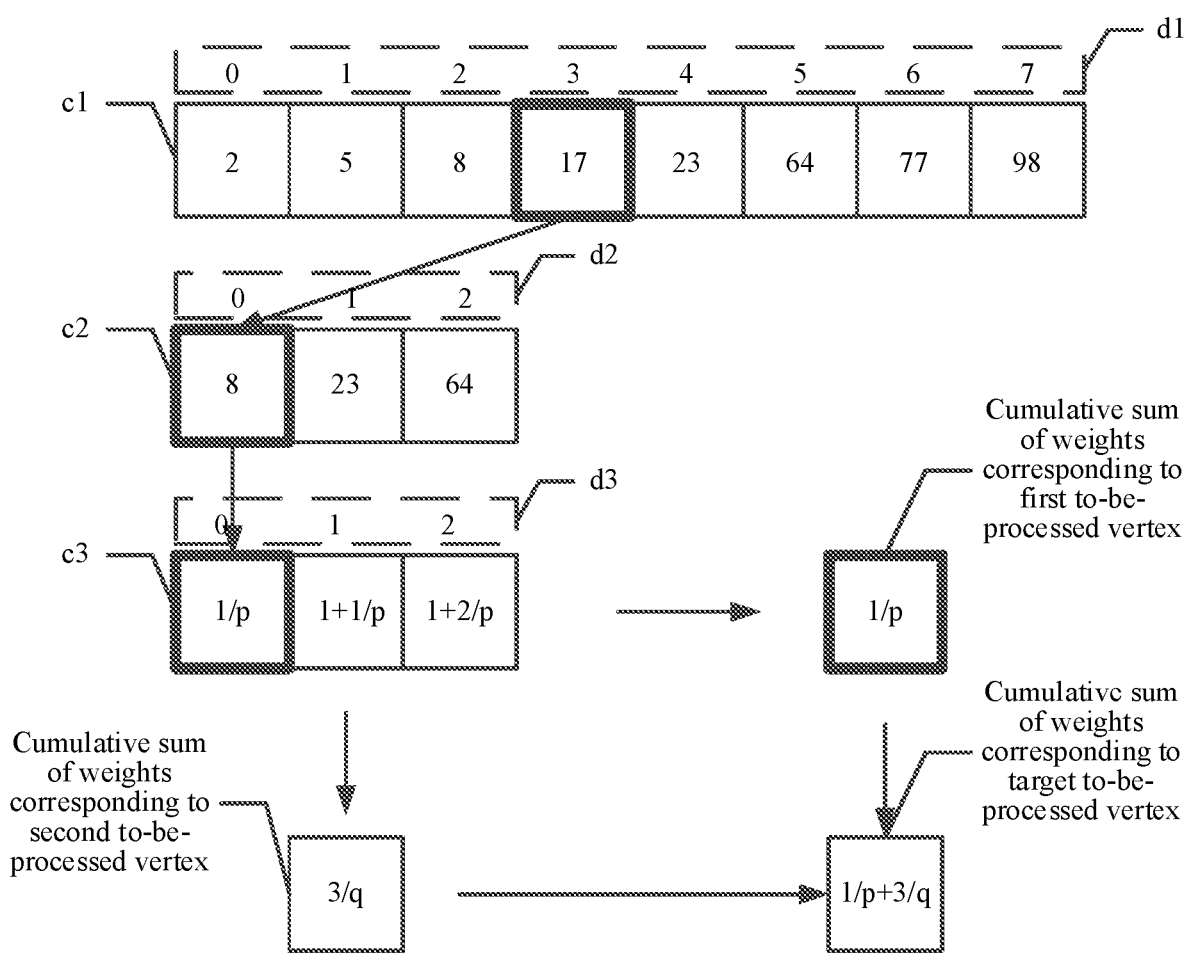
FIG. 8 is a schematic diagram of a scenario of computing a cumulative sum of weights according to an embodiment of this disclosure.

FIG. 8 is a schematic diagram of a scenario of computing a cumulative sum of weights according to an embodiment of this disclosure. As shown in FIG. 8, an array c1 is an array in which the identification information of all vertexes in the first out-neighbor set is arranged in ascending order, and may be referred to as the second vertex array. The second vertex array c1 includes 8 vertexes, and identification information of the 8 vertexes is 2, 5, 8, 17, 23, 64, 77, and 98 respectively. Each of the 8 vertexes corresponds to an index k=0, . . . , 7. As shown in FIG. 8, an index set d1 is a set of indexes corresponding to each vertex in the array c1, where an index of a vertex with identification information 2 is 0, an index of a vertex with identification information 5 is 1, an index of a vertex with identification information 8 is 2, an index of a vertex with identification information 17 is 3, an index of a vertex with identification information 23 is 4, an index of a vertex with identification information 64 is 5, an index of a vertex with identification information 77 is 6, and an index of a vertex with identification information is 98 is 7.

An array c2 is an array in which identification information of first-type vertexes and second-type vertexes in the array c1 are arranged from in ascending order, and may be referred to as the first vertex array. The first vertex array includes 3 vertexes, and identification information of the 3 vertexes are 8, 23, and 64 respectively. The vertex with the identification information 8 is the first-type vertex, and the vertex with the identification information 23 and the vertex with the identification information 64 are the second-type vertexes. Each vertex in the first vertex array c2 corresponds to an index k=0, 1, 2. As shown in FIG. 8, an index set d2 includes indexes corresponding to each vertex in the array c2. In the first vertex array c2, an index of the vertex with identification information 8 is 0, an index of the vertex with identification information 23 is 1, and an index of the vertex with identification information 64 is 2.

An array c3 includes a cumulative sum of weights corresponding to each vertex in the array c2. The array c3 may be referred to as the weight array. It is assumed that the transition weight between each vertex in the first out-neighbor set and the target walk vertex is 1, the scaling factor between the first-type vertex and the target walk vertex is 1/p, the scaling factor between the second-type vertex and the target walk vertex is 1, and the scaling factor between the third-type vertex and the target walk vertex is 1/q. Therefore, the cumulative sum of weights corresponding to the vertex with the identification information 8 in the array c2 is 1/p, the cumulative sum of weights corresponding to the vertex with the identification information 23 in the array c2 is 1+1/p, and the cumulative sum of weights corresponding to the vertex with the identification information 64 in the array c2 is 1+2/p.

Each weight in the array c3 corresponds to an index 0, 1, or 2. As shown in FIG. 8, an index set d3 is a set of indexes of cumulative sums of weights corresponding to each vertex in the array c3, where the cumulative sum of weights 1/p corresponding to the vertex with the identification information 8 corresponds to an index of 0, the cumulative sum of weights 1+1/p corresponding to the vertex with the identification information 23 corresponds to an index of 1, and the cumulative sum of weights 1+2/p corresponding to the vertex with the identification information 64 corresponds to an index of 2.

The second vertex array c1 is denoted by O[k], the first vertex array c2 is denoted by node[i], and the weight array c3 is denoted by aws[j]. A to-be-processed vertex O[3] with identification information 17 is selected in the second vertex array c1. A vertex with identification information not greater than 17 is searched for in the first vertex array c2, and a vertex node[0] with the identification information 8 is found. The cumulative sum of weights 1/p, that is, aws[0], corresponding to the vertex with the identification information 8 is searched for in the weight array, and 1/p corresponding to the found aws[0] is used as the cumulative sum of weights corresponding to the first to-be-processed vertex.

The index value of the vertex with the identification information 17 in the array c1 minus the index value of the vertex with the identification information 8 in the array c2 is 3, that is, for the vertex with the identification information 17, there are three other vertexes with identification information less than 17 in the first out-neighbor set. The three vertexes are the third-type vertexes, and are referred to as the second to-be-processed vertexes. Then, the cumulative sum of weights of the second to-be-processed vertexes is 3/q, and the cumulative sum of weights of the target to-be-processed vertex 17 is a sum of the cumulative sum of weights of the first to-be-processed vertex and the cumulative sum of weights of the second to-be-processed vertexes, which is 1/p+3/q. The first vertex array c1 and the weight array c3 are intermediate arrays for calculating the cumulative sum of weights corresponding to the first to-be-processed vertex and the cumulative sum of weights corresponding to the second to-be-processed vertex.

As can be seen, in this embodiment of this disclosure, the out-edge information sent by the historical walk vertex is received by the device corresponding to the target walk vertex, to dynamically calculate the edge transition probability between the target walk vertex and each vertex in the first out-neighbor set in real time, and finally determine the to-be-reached vertex. In this process, there is no need to pre-store the edge transition probability between the target walk vertex and each vertex in the first out-neighbor set, which saves the memory capacity of the system.

Figure 9:
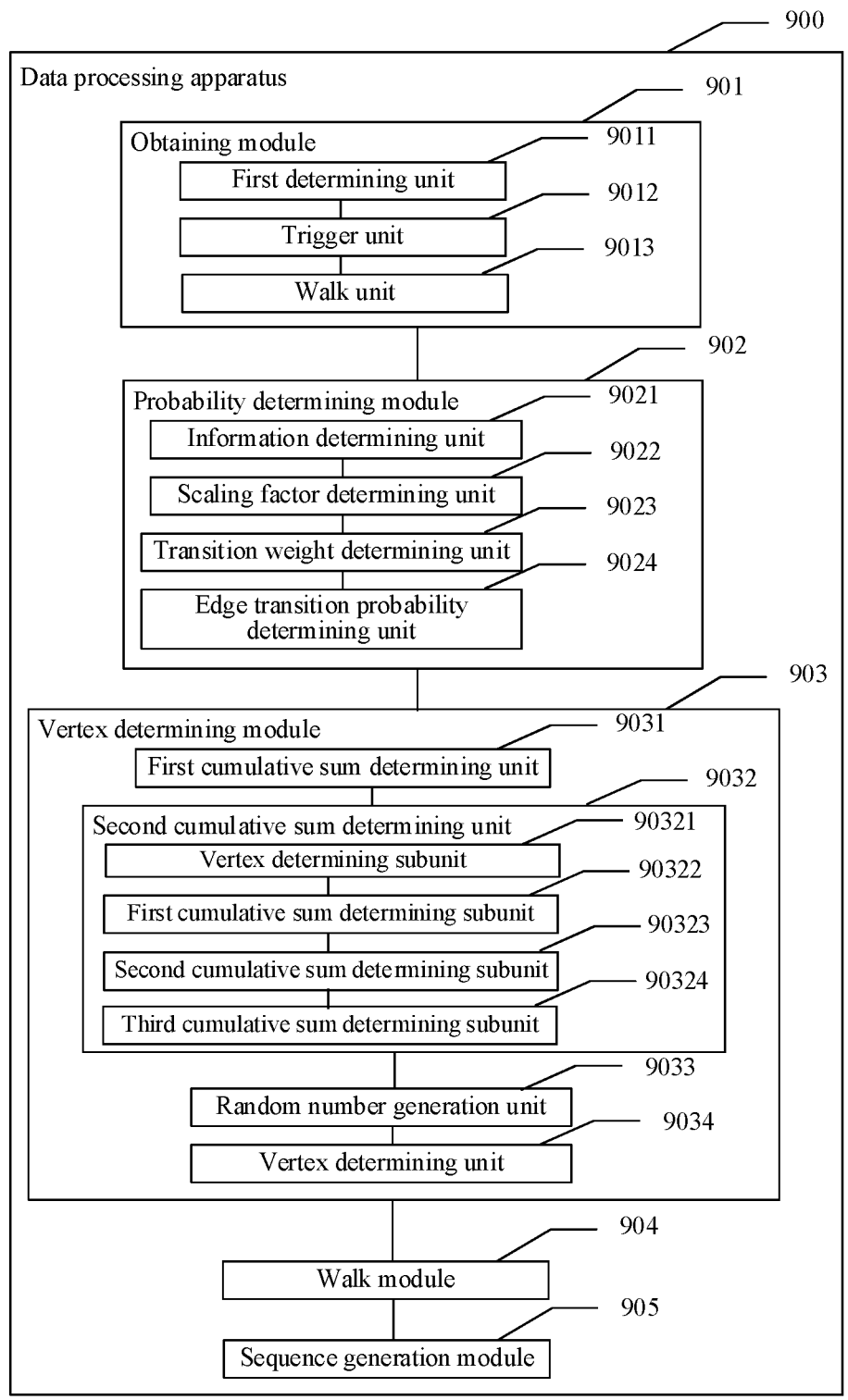
FIG. 9 is a schematic structural diagram of a data processing apparatus according to an embodiment of this disclosure.

FIG. 9 is a schematic structural diagram of a data processing apparatus according to an embodiment of this disclosure. As shown in FIG. 9, a data processing apparatus 900 may be applied to the distributed graph processing platform f shown in FIG. 1, and specifically includes: an obtaining module 901, a probability determining module 902, a vertex determining module 903, a walk module 904, and a sequence generation module 905. One or more modules, units, and/or subunits of the data processing apparatus can be implemented by processing circuitry, software, or a combination thereof, for example.

The obtaining module 901 is configured to specify a target walk vertex in a target graph, determine a historical walk vertex adjacent to the target walk vertex, and obtain first out-edge information transmitted from the historical walk vertex to the target walk vertex.

The probability determining module 902 is configured to obtain a first out-neighbor set, the first out-neighbor set referring to a set of next possible vertexes to be walked to from the target walk vertex; and determine an edge transition probability between the target walk vertex and each vertex in the first out-neighbor set according to the first out-edge information.

The vertex determining module 903 is configured to determine a to-be-reached vertex in the first out-neighbor set according to the edge transition probability.

The walk module 904 is configured to generate second out-edge information corresponding to the target walk vertex based on the first out-neighbor set, walk from the target walk vertex to the to-be-reached vertex, transmit the second out-edge information to the to-be-reached vertex, and determine the to-be-reached vertex as a new target walk vertex.

The sequence generation module 905 is configured to generate a random walk sequence corresponding to the target walk vertex in a case that a walk quantity corresponding to the target walk vertex reaches a preset threshold for walk steps.

For specific function implementations of the obtaining module 901, the probability determining module 902, the vertex determining module 903, the walk module 904, and the sequence generation module 905, reference may be made to steps S101 to S105 in the embodiment corresponding to FIG. 2, and details are not described herein again.

In an embodiment, the obtaining module 901 includes a first determining unit 9011, a trigger unit 9012, and a walk unit 9013. The first determining unit 9011 is configured to obtain all vertexes in the target graph, and determine each vertex in the target graph as an original vertex. The trigger unit 9012 is configured to respectively determine a target walk step quantity of each original vertex, and synchronously trigger an independent random walk task for the each original vertex based on the target walk step quantity. The walk unit 9013 is configured to determine an initial walk vertex among original vertexes for which the random walk tasks have been triggered, walk from the initial walk vertex to the target walk vertex, and determine the initial walk vertex as a historical walk vertex adjacent to the target walk vertex.

In an embodiment, the probability determining module 902 includes an information determining unit 9021, an information determining unit 9021, a transition weight determining unit 9023, and a transition weight determining unit 9023. The information determining unit 9021 is configured to determine target out-edge information according to the first out-edge information.

The scaling factor determining unit 9022 is configured to respectively determine a scaling factor between the target walk vertex and the each vertex in the first out-neighbor set according to identification information of the target walk vertex, the first out-neighbor set, identification information of the historical walk vertex in the target out-edge information, identification information of the initial walk vertex, and a second out-neighbor set corresponding to the historical walk vertex.

The transition weight determining unit 9023 is configured to obtain, in the target graph, a transition weight between the target walk vertex and the each vertex in the first out-neighbor set. The edge transition probability determining unit 9024 is configured to determine an edge transition probability between the target walk vertex and the each vertex in the first out-neighbor set according to the transition weight and the scaling factor.

In an embodiment, the scaling factor determining unit 9022 is configured to respectively determine a vertex type of the each vertex in the first out-neighbor set according to the identification information of the target walk vertex, the first out-neighbor set, the identification information of the historical walk vertex in the target out-edge information, and the second out-neighbor set, and respectively determine a scaling factor of the each vertex in the first out-neighbor set according to the vertex type.

In an embodiment, the scaling factor determining unit 9022 is configured to determine a vertex, which is the historical walk vertex, in the first out-neighbor set as a first-type vertex; determine a vertex, which is a common out-neighbor vertex with a vertex in the second out-neighbor set, in the first out-neighbor set as a second-type vertex; and determine a vertex in the first out-neighbor set except the first-type vertex and the second-type vertex as a third-type vertex.

In an embodiment, the vertex determining module 903 includes a first cumulative sum determining unit 9031, a second cumulative sum determining unit 9032, a random number generation unit 9033, and a vertex determining unit 9034. The first cumulative sum determining unit 9031 is configured to respectively determine a cumulative sum of edge transition probabilities of each vertex in the first out-neighbor set according to the edge transition probability between the target walk vertex and the each vertex in the first out-neighbor set.

The second cumulative sum determining unit 9032 is configured to respectively determine a cumulative sum of weights of the each vertex in the first out-neighbor set according to the transition weight and the scaling factor between the target walk vertex and the each vertex in the first out-neighbor set. The random number generation unit 9033 is configured to generate a random number based on a uniform distribution and the cumulative sum of weights of the each vertex in the first out-neighbor set. The vertex determining unit 9034 is configured to determine the to-be-reached vertex according to the random number and a value range of the cumulative sum of edge transition probabilities of the each vertex in the first out-neighbor set.

In an embodiment, the second cumulative sum determining unit 9032 includes a vertex determining subunit 90321, a first cumulative sum determining subunit 90322, a second cumulative sum determining subunit 90323, and a third cumulative sum determining subunit 90324. The vertex determining subunit 90321 is configured to determine the each vertex in the first out-neighbor set as a target to-be-processed vertex. The first cumulative sum determining subunit 90322 is configured to determine a cumulative sum of weights of a first to-be-processed vertex according to identification information of the target to-be-processed vertex, identification information and a scaling factor of the first-type vertex, a transition weight between the first-type vertex and the target walk vertex, identification information and a scaling factor of the second-type vertex, and a transition weight between the second-type vertex and the target walk vertex.

The second cumulative sum determining subunit 90323 is configured to determine a cumulative sum of weights of a second to-be-processed vertex according to identification information and a scaling factor of the third-type vertex, and a transition weight between the third-type vertex and the target walk vertex. The third cumulative sum determining subunit 90324 is configured to determine a cumulative sum of weights of the target to-be-processed vertex according to the cumulative sum of weights of the first to-be-processed vertex and the cumulative sum of weights of the second to-be-processed vertex.

Figure 10:
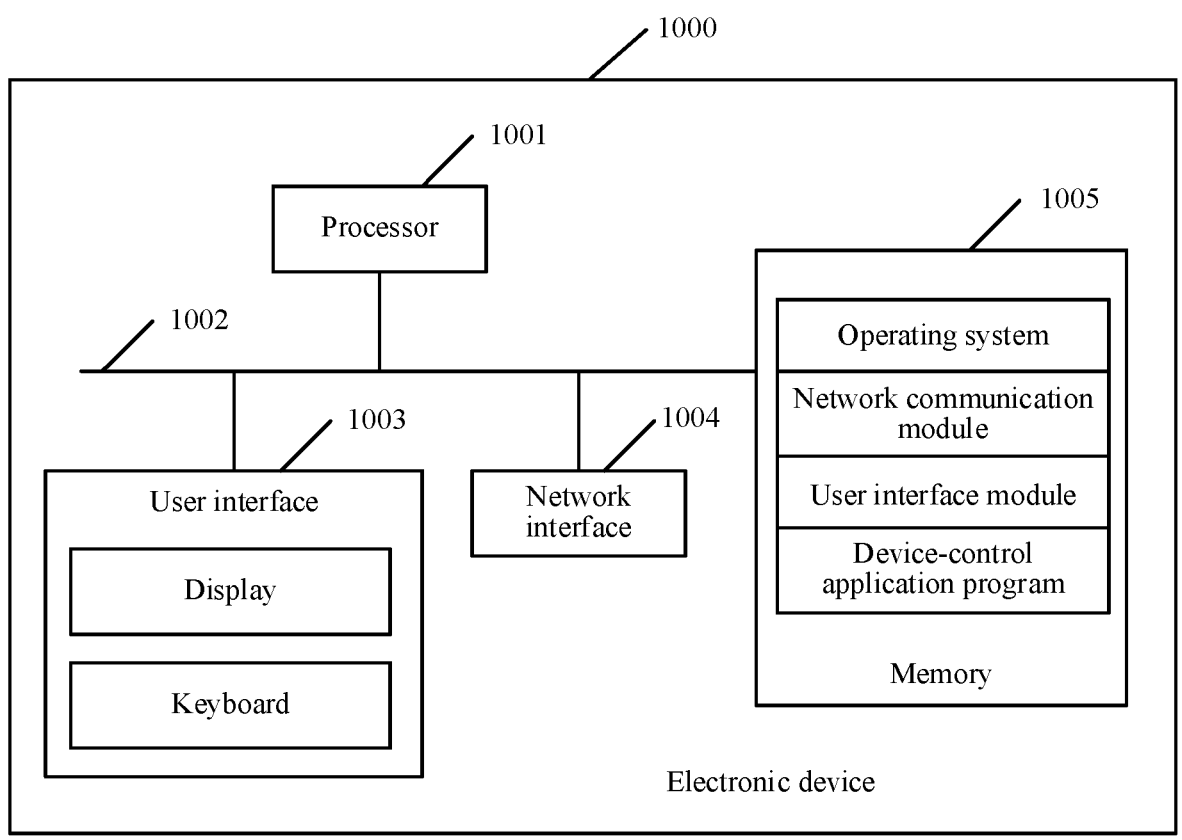
FIG. 10 is a schematic structural diagram of an electronic device according to an embodiment of this disclosure.

FIG. 10 is a schematic structural diagram of an electronic device according to an embodiment of this disclosure. As shown in FIG. 10, an electronic device 1000 may be the distributed graph processing platform f shown in FIG. 1, and specifically includes: a processor 1001 (e.g., processing circuitry), a network interface 1004, and a memory 1005. In addition, the electronic device 1000 may further include: a user interface 1003 and at least one communication bus 1002. The communication bus 1002 is configured to implement connection and communication between the components. The user interface 1003 may include a display, a keyboard, and optionally, the user interface 1003 may further include a standard wired interface and a standard wireless interface. Optionally, the network interface 1004 may include a standard wired interface and a standard wireless interface (such as a Wi-Fi interface). The memory 1005 may be a high-speed RAM, or may be a non-volatile memory, for example, at least one magnetic disk memory. Optionally, the memory 1005 may be at least one storage apparatus that is located far away from the foregoing processor 1001. As shown in FIG. 10, the memory 1005, which is used as a computer storage medium, may include an operating system, a network communication module, a user interface module, and a device control application program.

In the electronic device 1000 shown in FIG. 10, the network interface 1004 may provide a network communication function, and the user interface 1003 is mainly configured to provide an input interface for a user. The processor 1001 may be configured to invoke the device-control application program stored in the memory 1005, to implement the descriptions of the data processing method in any one of the foregoing corresponding embodiments.

It is to be understood that, the electronic device 1000 described in this embodiment of this disclosure can implement the descriptions of the data processing method in any one of the foregoing corresponding embodiments, and can also implement the descriptions of the data processing apparatus 1 in the embodiment corresponding to FIG. 9. Details are not described herein again. In addition, the description of beneficial effects of the same method are not described herein again.

In addition, the embodiments of this disclosure further provide a computer storage medium, such as a non-transitory computer-readable storage medium. The computer storage medium stores a computer program executed by the data processing apparatus 1. The computer program includes a program instruction. When executing the program instruction, the processor can implement the descriptions of the data processing method in any one of the foregoing corresponding embodiments. Therefore, details are not described herein again. In addition, the description of beneficial effects of the same method are not described herein again. For technical details that are not disclosed in the computer storage medium embodiments of this disclosure, refer to the descriptions of the method embodiments of this disclosure.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The foregoing storage medium may include a magnetic disc, an optical disc, a read-only memory (ROM), a random access memory (RAM), or the like.

What is disclosed above is merely exemplary embodiments of this disclosure, and is not intended to limit the scope of the claims of this disclosure. Therefore, equivalent variations made in accordance with the claims of this disclosure shall fall within the scope of this disclosure.

What is claimed is:

1. A data processing method, the method comprising:
specifying a target walk vertex in a target graph of a plurality of vertexes;
determining a historical walk vertex adjacent to the target walk vertex in the target graph;
obtaining first out-edge information transmitted from a first device of the historical walk vertex to a second device of the target walk vertex;
obtaining a first out-neighbor set, the first out-neighbor set including a set of next possible vertexes to be walked to from the target walk vertex;
determining, for each of the set of next possible vertexes in the first out-neighbor set, an edge transition probability according to the first out-edge information, the edge transition probability of the respective next possible vertex indicating a transition probability between an edge formed by the historical walk vertex and the target walk vertex and an edge formed by the target walk vertex and the respective next possible vertex;
determining a to-be-reached vertex of the set of next possible vertexes in the first out-neighbor set according to the edge transition probabilities;
generating second out-edge information corresponding to the target walk vertex based on the first out-neighbor set;
walking from the target walk vertex to the to-be-reached vertex in the target graph;
transmitting the second out-edge information to a third device of the to-be-reached vertex;
determining the to-be-reached vertex as a new target walk vertex; and
generating, by processing circuitry, a random walk sequence corresponding to the target walk vertex based on a walk step quantity from an initial walk vertex to the target walk vertex reaching a preset threshold for walk steps.

2. The method according to claim 1, wherein the determining the historical walk vertex comprises:
obtaining all vertexes in the target graph;
determining each vertex in the target graph as an original vertex;
determining a target walk step quantity of each original vertex;
synchronously triggering an independent random walk task for the each original vertex to generate a respective random walk sequence based on the target walk step quantity of the respective original vertex;
determining an initial walk vertex among original vertexes for which the random walk tasks have been triggered;
walking from the initial walk vertex to the target walk vertex in the target graph; and
determining the initial walk vertex as the historical walk vertex adjacent to the target walk vertex.

3. The method according to claim 1, wherein the determining the edge transition probability comprises:
determining target out-edge information according to the first out-edge information;
determining a scaling factor between the target walk vertex and the each next possible vertex in the first out-neighbor set according to identification information of the target walk vertex, the first out-neighbor set, identification information of the historical walk vertex in the target out-edge information, identification information of an initial walk vertex, and a second out-neighbor set corresponding to the historical walk vertex;
obtaining, in the target graph, a transition weight between the target walk vertex and the each next possible vertex in the first out-neighbor set; and
determining the edge transition probability between the target walk vertex and the each next possible vertex in the first out-neighbor set according to the transition weight and the scaling factor.

4. The method according to claim 3, wherein the determining the target out-edge information comprises:
determining the first out-edge information as the target out-edge information based on the first out-edge information including the second out-neighbor set.

5. The method according to claim 3, wherein the determining the target out-edge information comprises:
obtaining, when the first out-edge information includes graph division identification information, the second out-neighbor set in response to determining, according to the graph division identification information, that the historical walk vertex and the target walk vertex are vertexes in the same subgraph;
adding the second out-neighbor set to the first out-edge information; and
determining the first out-edge information including the second out-neighbor set as the target out-edge information.

6. The method according to claim 3, wherein the determining the target out-edge information comprises:
obtaining, when the first out-edge information includes indication information, the second out-neighbor set corresponding to the historical walk vertex and the identification information of the historical walk vertex from a hash table based on the indication information;
adding the second out-neighbor set to the first out-edge information; and
determining the first out-edge information including the second out-neighbor set as the target out-edge information.

7. The method according to claim 3, wherein the determining the scaling factor comprises:
determining a vertex type of the each next possible vertex in the first out-neighbor set according to the identification information of the target walk vertex, the first out-neighbor set, the identification information of the historical walk vertex in the target out-edge information, and the second out-neighbor set; and determining the scaling factor of the each next possible vertex in the first out-neighbor set according to the vertex type of the respective next possible vertex.

8. The method according to claim 7, wherein the determining the vertex type of the each next possible vertex comprises:

determining the historical walk vertex as a first-type vertex;

determining a common out-neighbor vertex that is included in the first out-neighbor set and the second out-neighbor set; and determining a third-type vertex in the first out-neighbor set that is different from the first-type vertex and the second-type vertex.

9. The method according to claim 6, further comprising:

obtaining an out-degree value of the historical walk vertex in response to detecting that the historical walk vertex is accessed for the first time; and caching the second out-neighbor set into the hash table based on the identification information of the historical walk vertex when the out-degree value reaches a first metric value threshold.

10. The method according to claim 6, further comprising:

obtaining an in-degree value of the historical walk vertex in response to detecting that the historical walk vertex is accessed for the first time; and caching the second out-neighbor set into the hash table based on the identification information of the historical walk vertex when the in-degree value reaches a second metric value threshold.

11. The method according to claim 6, further comprising:

caching the second out-neighbor set into the hash table based on the identification information of the historical walk vertex when a value of a number of accesses of the historical walk vertex equals reaches a third metric value threshold.

12. The method according to claim 8, wherein the determining the to-be-reached vertex of the set of next possible vertexes comprises:

determining a cumulative sum of the edge transition probabilities of the next possible vertexes in the first out-neighbor set;

determining a cumulative sum of weights of the next possible vertexes in the first out-neighbor set according to the transition weight and the scaling factor between the target walk vertex and the next possible vertexes in the first out-neighbor set;

generating a random number based on a uniform distribution and the cumulative sum of the weights; and determining the to-be-reached vertex according to the random number and a value range of the cumulative sum of the edge transition probabilities.

13. The method according to claim 12, wherein the determining the cumulative sum of weights of the next possible vertexes comprises:

for each next possible vertex in the first out-neighbor set, determining a cumulative sum of weights of a first to-be-processed vertex according to identification information of the respective next possible vertex, identification information and a scaling factor of the first-type vertex, a transition weight between the first-type vertex and the target walk vertex, identification information and a scaling factor of the second-type vertex, and a transition weight between the second-type vertex and the target walk vertex;

determining a cumulative sum of weights of a second to-be-processed vertex according to identification information and a scaling factor of the third-type vertex, and a transition weight between the third-type vertex and the target walk vertex; and determining a cumulative sum of weights of the respective next possible vertex according to the cumulative sum of the weights of the first to-be-processed vertex and the cumulative sum of the weights of the second to-be-processed vertex.

14. The method according to claim 13, wherein the determining the cumulative sum of weights of the first to-be-processed vertex comprises:

sorting the first-type vertex and the second-type vertex based on values of the identification information of the vertexes;

generating a first vertex array according to the sorted first-type vertex and second-type vertex;

determining a cumulative sum of weights of each vertex in the first vertex array according to a transition weight and a scaling factor between the target walk vertex and each vertex in the first vertex array and based on a sorting relationship of the each vertex in the first vertex array;

generating a weight array according to the cumulative sum of weights of the each vertex in the first vertex array;

searching the first vertex array for vertexes whose values of identification information are not greater than a value of the identification information of a target to-be-processed vertex;

determining all found vertexes as the first to-be-processed vertexes;

obtaining, in the weight array, a cumulative sum of weights corresponding to a vertex with a largest value of identification information in the first to-be-processed vertexes; and determining the obtained cumulative sum of weights as the cumulative sum of weights of the first to-be-processed vertexes.

15. The method according to claim 13, wherein the determining the cumulative sum of weights of the second to-be-processed vertex comprises:

sorting all vertexes in the first out-neighbor set based on values of identification information of the vertexes;

generating a second vertex array according to all the sorted vertexes;

searching the second vertex array for all vertexes whose values of identification information are not greater than the value of the identification information of a target to-be-processed vertex;

determining all found vertexes as to-be-selected vertexes;

determining all vertexes in the to-be-selected vertexes except the first to-be-processed vertexes as the second to-be-processed vertexes; and determining the cumulative sum of weights of the second to-be-processed vertexes according to a transition weight and a scaling factor between the target walk vertex and each vertex in the second to-be-processed vertexes.

16. A data processing apparatus, comprising:

processing circuitry configured to:

specify a target walk vertex in a target graph of a plurality of vertexes;

determine a historical walk vertex adjacent to the target walk vertex in the target graph;

obtain first out-edge information transmitted from a first device of the historical walk vertex to a second device of the target walk vertex;

obtain a first out-neighbor set, the first out-neighbor set including a set of next possible vertexes to be walked to from the target walk vertex;

determine, for each of the set of next possible vertexes in the first out-neighbor set, an edge transition probability according to the first out-edge information, the edge transition probability of the respective next possible vertex indicating a transition probability between an edge formed by the historical walk vertex and the target walk vertex and an edge formed by the target walk vertex and the respective next possible vertex;

determine a to-be-reached vertex of the set of next possible vertexes in the first out-neighbor set according to the edge transition probabilities;

generate second out-edge information corresponding to the target walk vertex based on the first out-neighbor set;

walk from the target walk vertex to the to-be-reached vertex in the target graph;

transmit the second out-edge information to a third device of the to-be-reached vertex;

determine the to-be-reached vertex as a new target walk vertex; and generate a random walk sequence corresponding to the target walk vertex based on a walk step quantity from an initial walk vertex to the target walk vertex reaching a preset threshold for walk steps.

17. The apparatus according to claim 16, wherein the processing circuitry is configured to:

obtain all vertexes in the target graph;

determine each vertex in the target graph as an original vertex;

determine a target walk step quantity of each original vertex;

synchronously trigger an independent random walk task for the each original vertex to generate a respective random walk sequence based on the target walk step quantity of the respective original vertex;

determine an initial walk vertex among original vertexes for which the random walk tasks have been triggered;

walk from the initial walk vertex to the target walk vertex in the target graph; and determine the initial walk vertex as the historical walk vertex adjacent to the target walk vertex.

18. The apparatus according to claim 16, wherein the processing circuitry is configured to:

determine target out-edge information according to the first out-edge information;

determine a scaling factor between the target walk vertex and the each next possible vertex in the first out-neighbor set according to identification information of the target walk vertex, the first out-neighbor set, identification information of the historical walk vertex in the target out-edge information, identification information of an initial walk vertex, and a second out-neighbor set corresponding to the historical walk vertex;

obtain, in the target graph, a transition weight between the target walk vertex and the each next possible vertex in the first out-neighbor set; and determine the edge transition probability between the target walk vertex and the each next possible vertex in the first out-neighbor set according to the transition weight and the scaling factor.

19. The apparatus according to claim 18, wherein the processing circuitry is configured to:

determine a vertex type of the each next possible vertex in the first out-neighbor set according to the identification information of the target walk vertex, the first out-neighbor set, the identification information of the historical walk vertex in the target out-edge information, and the second out-neighbor set; and determine the scaling factor of the each next possible vertex in the first out-neighbor set according to the vertex type of the respective next possible vertex.

20. A non-transitory computer storage medium storing instructions which when executed by a processor cause the processor to perform:

specifying a target walk vertex in a target graph of a plurality of vertexes;

determining a historical walk vertex adjacent to the target walk vertex in the target graph;

obtaining first out-edge information transmitted from a first device of the historical walk vertex to a second device of the target walk vertex;

obtaining a first out-neighbor set, the first out-neighbor set including a set of next possible vertexes to be walked to from the target walk vertex;

determining, for each of the set of next possible vertexes in the first out-neighbor set, an edge transition probability according to the first out-edge information, the edge transition probability of the respective next possible vertex indicating a transition probability between an edge formed by the historical walk vertex and the target walk vertex and an edge formed by the target walk vertex and the respective next possible vertex;

determining a to-be-reached vertex of the set of next possible vertexes in the first out-neighbor set according to the edge transition probabilities;

generating second out-edge information corresponding to the target walk vertex based on the first out-neighbor set;

walking from the target walk vertex to the to-be-reached vertex in the target graph;

transmitting the second out-edge information to the to-be-reached vertex;

determining the to-be-reached vertex as a new target walk vertex; and generating a random walk sequence corresponding to the target walk vertex based on a walk step quantity from an initial walk vertex to the target walk vertex reaching a preset threshold for walk steps.

* * * * *